(12) United States Patent
Dinan

(10) Patent No.: US 10,797,840 B2
(45) Date of Patent: *Oct. 6, 2020

(54) SOUNDING REFERENCE SIGNAL TRANSMISSION OR DROPPING IN A WIRELESS NETWORK

(71) Applicant: Ofinno, LLC, Reston, VA (US)

(72) Inventor: Esmael Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/432,267

(22) Filed: Jun. 5, 2019

(65) Prior Publication Data

US 2019/0288896 A1    Sep. 19, 2019

Related U.S. Application Data

(63) Continuation of application No. 15/417,733, filed on Jan. 27, 2017, now Pat. No. 10,348,543.

(60) Provisional application No. 62/228,679, filed on Jan. 29, 2016.

(51) Int. Cl.
| | |
|---|---|
| *H04L 27/26* | (2006.01) |
| *H04L 5/00* | (2006.01) |
| *H04L 27/00* | (2006.01) |

(52) U.S. Cl.
CPC ............ *H04L 5/0048* (2013.01); *H04L 5/001* (2013.01); *H04L 27/0006* (2013.01); *H04L 27/2613* (2013.01)

(58) Field of Classification Search
CPC . H04L 27/0006; H04L 27/2613; H04L 5/001; H04L 5/0051; H04L 5/0053; H04L 5/00
See application file for complete search history.

(56) References Cited

U.S. PATENT DOCUMENTS

| | | |
|---|---|---|
| 2012/0263129 A1 | 10/2012 | Noh et al. |
| 2014/0119304 A1 | 5/2014 | Li |
| 2014/0219255 A1 | 8/2014 | Eyuboglu et al. |
| 2015/0304957 A1 | 10/2015 | Noh et al. |
| 2015/0372792 A1 | 12/2015 | Damnjanovic et al. |
| 2017/0118728 A1 | 4/2017 | Harada et al. |

(Continued)

OTHER PUBLICATIONS

3GPP TR 36.889 V1.0.1 (Jun. 2015); 3rd Generation Partnership Project; Technical Specification Group Radio Access Network; Study on Licensed-Assisted Access to Unlicensed Spectrum; (Release 13).

(Continued)

*Primary Examiner* — Edan Orgad
*Assistant Examiner* — Nourali Mansoury
(74) *Attorney, Agent, or Firm* — David Grossman; Kavon Nasabzadeh; Philip Smith

(57) ABSTRACT

A wireless device receives configuration parameters of one or more licensed cells and one or more unlicensed cells. A physical uplink shared channel (PUSCH) signal is transmitted via a licensed cell of the one or more licensed cells. A determination is made, independent of transmissions of the PUSCH signal via the licensed cell, whether to transmit or to drop configured transmission of at least one sounding reference signal (SRS) via the one or more unlicensed cells. The configured transmission of the at least one SRS is overlapping with the PUSCH signal. Based on the determination: the at least one SRS is transmitted via an unlicensed cell of the one or more unlicensed cells; or the at least one SRS is dropped.

20 Claims, 18 Drawing Sheets

(56) References Cited

U.S. PATENT DOCUMENTS

2017/0208581 A1    7/2017    Yang et al.
2018/0175975 A1    6/2018    Um et al.

OTHER PUBLICATIONS

3GPP TS 36.211 V13.0.0 (Dec. 2015), Technical Specification, 3rd Generation Partnership Project; Technical Specification Group Radio Access Network; Evolved Universal Terrestrial Radio Access (E-UTRA);Physical channels and modulation (Release 13).
3GPP TS 36.212 V13.0.0 (Dec. 2015) 3rd Generation Partnership Project; Technical Specification Group Radio Access Network; Evolved Universal Terrestrial Radio Access (E-UTRA); Multiplexing and channel coding (Release 13).
3GPP TS 36.213 V13.0.1 (Jan. 2016).
3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TS 36.321 V13.0.0 (Dec. 2015); 3rd Generation Partnership Project; Technical Specification Group Radio Access Network; Evolved Universal Terrestrial Radio Access (E-UTRA); Medium Access Control (MAC) protocol specification (Release 13).
3GPP TS 36.331 V13.0.0 (Dec. 2015); 3rd Generation Partnership Project; Technical Specification Group Radio Access Network; Evolved Universal Terrestrial Radio Access (E-UTRA); Radio Resource Control (RRC);Protocol specification (Release 13).
3GPP TSG RAN WG1 #80bis; R1-151404; Apr. 20-24, 2015; Belgrade, Serbia; Source: Qualcomm Incorporated; Title: Adaptive Frame Structure and DL-UL configuration for LAA.
3GPP TSG RAN WG1 #80bis; R1-151407; Apr. 20-24, 2015; Belgrade, Serbia; Source: Qualcomm Incorporated; Title: Uplink Waveform for LAA.
3GPP TSG RAN WG1 #81; R1-152783; May 25-29, 2015; Fukuoka, Japan; Source: Qualcomm Incorporated; Title: Adaptive Frame Structure and DL-UL configuration for LAA.
3GPP TSG RAN WG1 #81; R1-152790; Apr. 25-29, 2015; Fukuoka, Japan; Source: Qualcomm Incorporated; Title: Uplink Waveform for LAA.
3GPP TSG RAN WG1 Meeting #80bis; R1-151958; Belgrade, Serbia, Apr. 20-24, 2015; Source: NTT DOCOMO, Inc.; Title: Discussion on issues related to UL transmission in LAA.
3GPP TSG RAN WG1 Meeting #80bis; R1-151302; Belgrade, Serbia, Apr. 20-24, 2015; Agenda Item: 7.2.4.2; Source: Huawei, HiSilicon; Title: Support of UL transmission for LAA.
3GPP TSG RAN WG1 meeting #80bis; R1-151516; Belgrade, Serbia, Apr. 20-24, 2015; Source: LG Electronics; Title: LBT operation for LAA UL.
3GPP TSG RAN WG1 Meeting #80bis; R1-151627; Belgrade, Serbia, Apr. 20-24, 2015; Source: Samsung; Title: Discussion on UL transmission for LAA.
3GPP TSG RAN WG1 Meeting #80bis; R1-151719; Belgrade, Serbia, Apr. 20-24, 2015; Source: ZTE; Title: Potential design for LAA UL transmission.
3GPP TSG RAN WG1 Meeting #80bis; R1-152293; Belgrade, Serbia, Apr. 20-24, 2015; WF on SRS for LAA UL.
3GPP TSG RAN WG1 Meeting #80bis; R1-152376; Belgrade, Serbia, Apr. 20-24, 2015; WF on SRS for LAA UL.
3GPP TSG RAN WG1 Meeting #81, R1-153136, Fukuoka, Japan, May 25-29, 2015, Source: Ericsson, Title: On SRS Transmissions for LAA.
3GPP TSG RAN WG1 Meeting #81; R1-152816; Fukuoka, Japan, May 25-29, 2015; Source: Nokia Networks; Title: On the remaining PHY issues for LAA UL operation.
3GPP TSG RAN WG1 Meeting #81; R1-152817; Fukuoka, Japan, May 25-29, 2015; Source: Nokia Networks; Title: UL LBT and Configurable Frame Structure for UL/DL operation.
3GPP TSG RAN WG1 Meeting #81; R1-152872; Fukuoka, Japan; May 25-29, 2015; Source: Samsung; Title: Discussion on UL transmission for LAA.
3GPP TSG RAN WG1 Meeting #81; R1-152970; Fukuoka, Japan, May 25-29, 2015; Source: ZTE; Title: Overview on LAA UL.
3GPP TSG RAN WG1 Meeting #81; R1-152971; Fukuoka, Japan, May 25-29, 2015; Source: ZTE; Title: Remaining Issues on LAA UL.
3GPP TSG RAN WG1 Meeting #81; R1-152990; Fukuoka, Japan, May 25-29, 2015; Source: Alcatel-Lucent Shanghai Bell, Alcatel-Lucent; Title: LBT and Frame Structure Design for LAA with DL and UL.
3GPP TSG-RAN WG1 Meeting #80bis; R1-151841; Belgrade, Serbia, Apr. 20-24, 2015; Source: Nokia Networks; Title: On the PHY options for LAA UL operation.
3GPP TSG-RAN WG1 Meeting #80bis; R1-151842; Belgrade, Serbia, Apr. 20-24, 2015; Source: Nokia Networks; Title: UL LBT and Configurable Frame Structure for UL/DL operation.
International Partial Search Report dated Apr. 12, 2017, in PCT/US2017/015474.

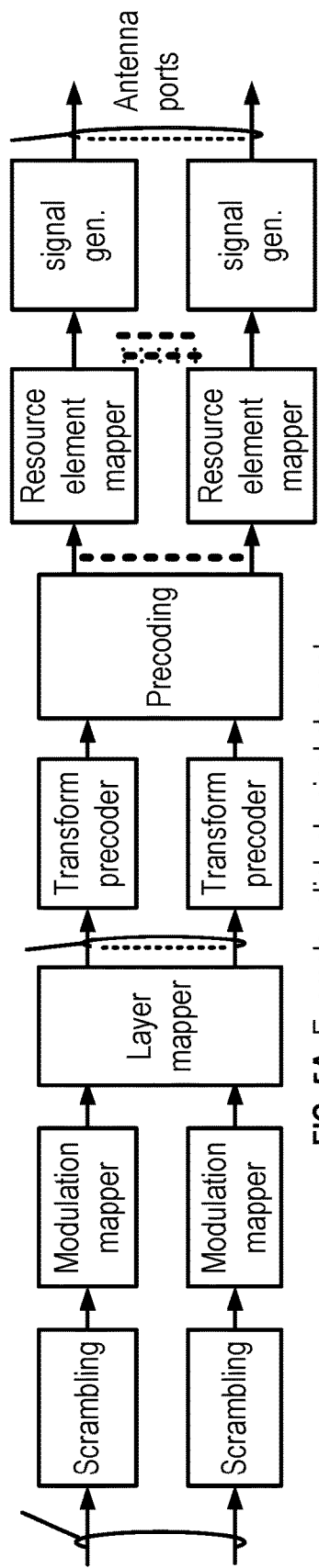
FIG. 5A Example uplink physical channel
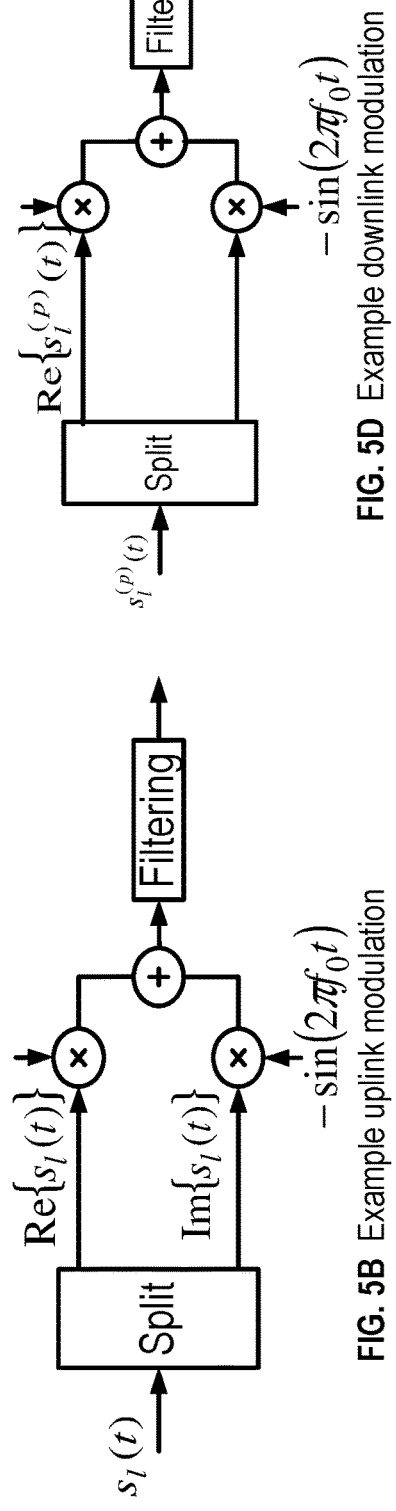
FIG. 5B Example uplink modulation
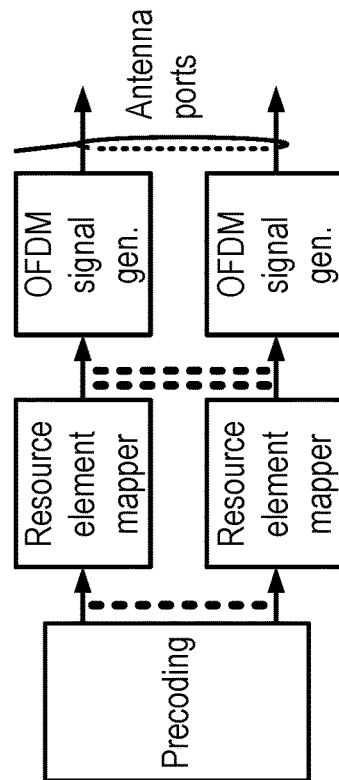
FIG. 5D Example downlink modulation
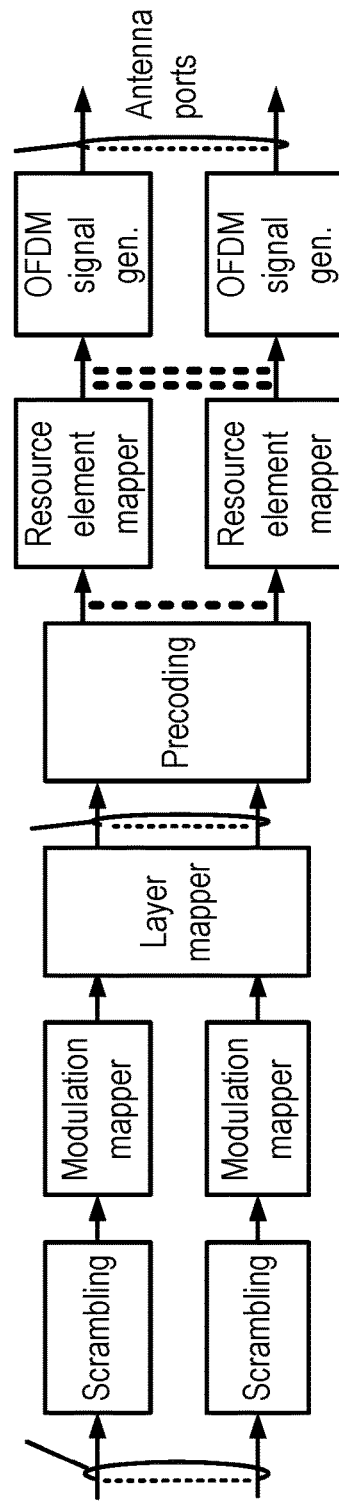
FIG. 5C Example downlink physical channel Dual-Connectivity at eNB FIG. 7 Dual-Connectivity- two MAC entities at UE side

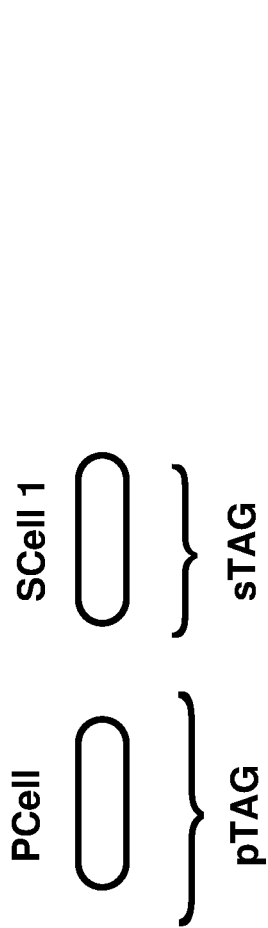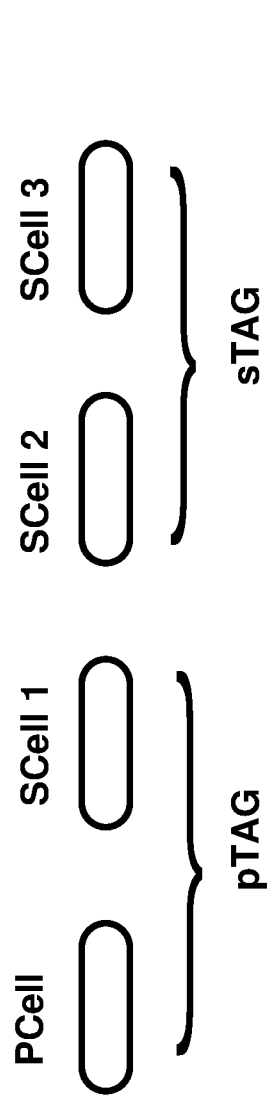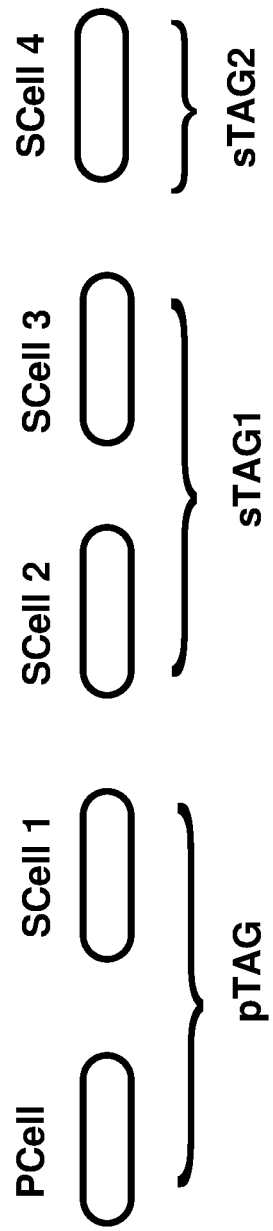
FIG. 8

SOUNDING REFERENCE SIGNAL TRANSMISSION OR DROPPING IN A WIRELESS NETWORK

CROSS-REFERENCE TO RELATED APPLICATIONS

This application is a continuation of U.S. patent application Ser. No. 15/417,733, filed Jan. 27, 2017, which claims the benefit of U.S. Provisional Application No. 62/228,679, filed Jan. 29, 2016, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

DETAILED DESCRIPTION OF EMBODIMENTS

Figure 1:
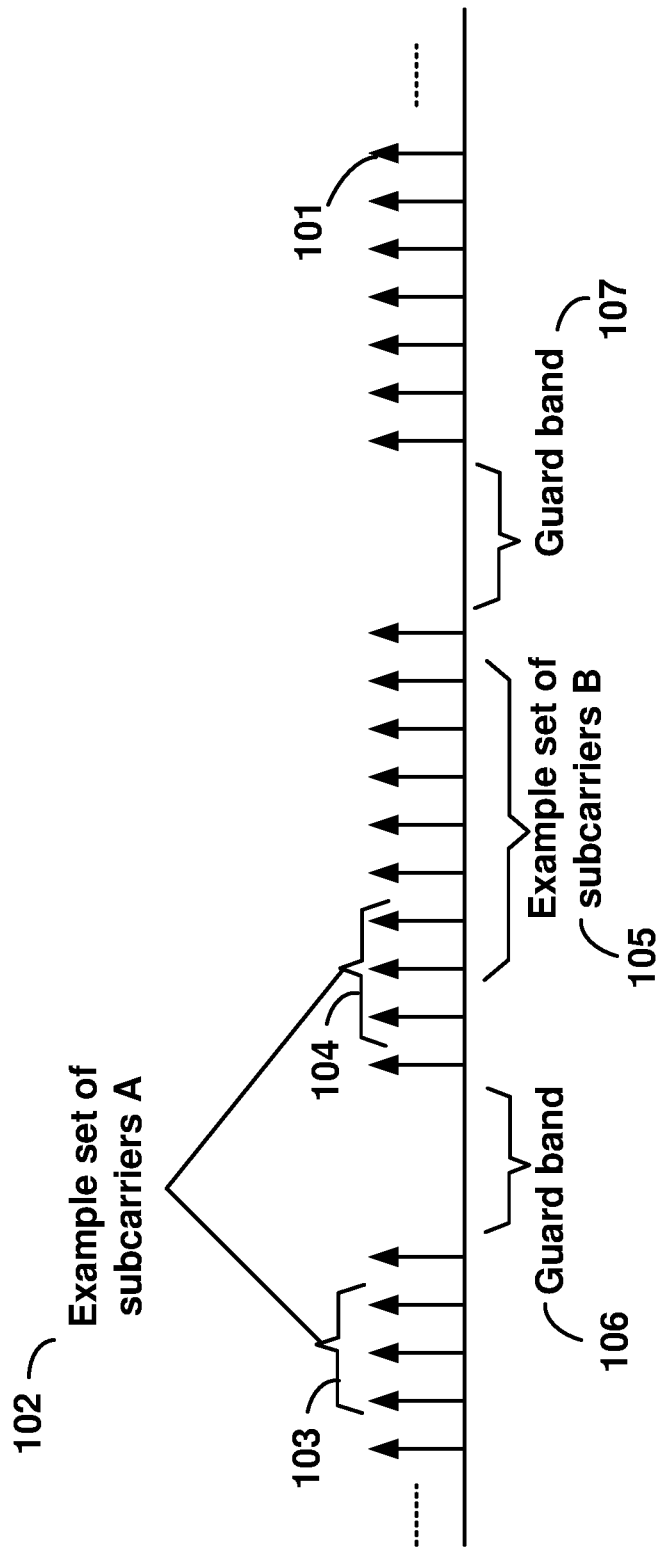
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
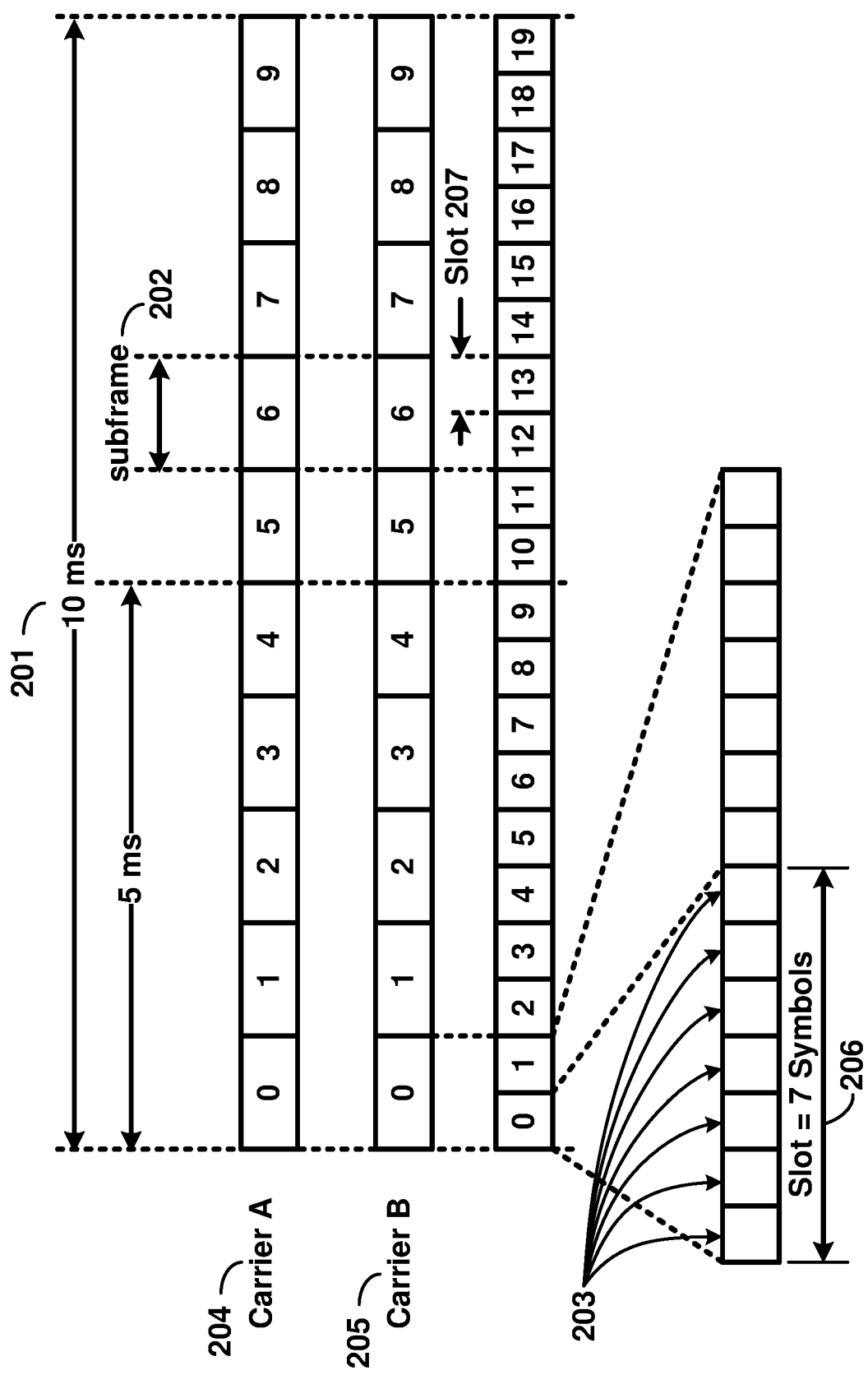
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
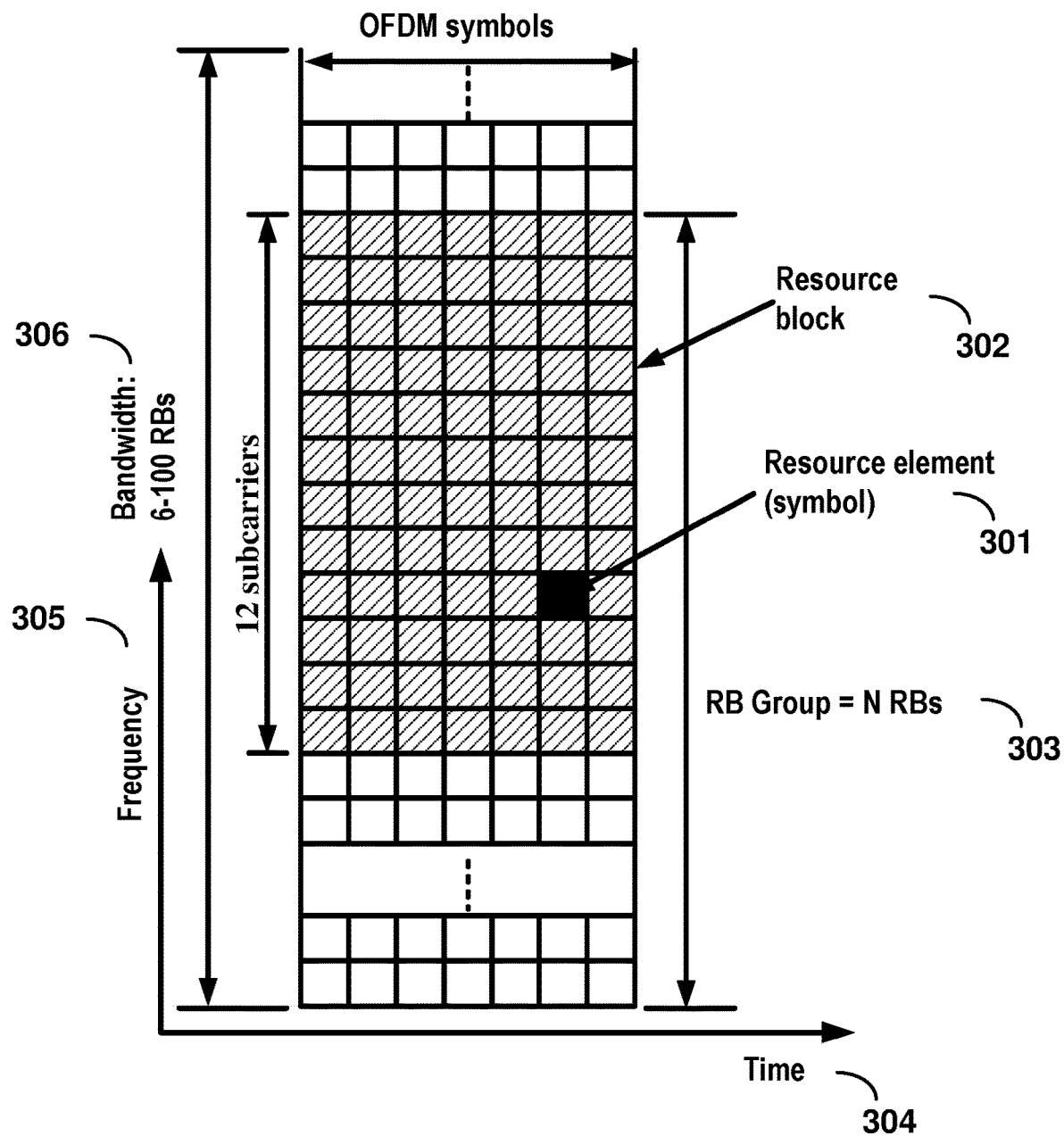
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-TDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
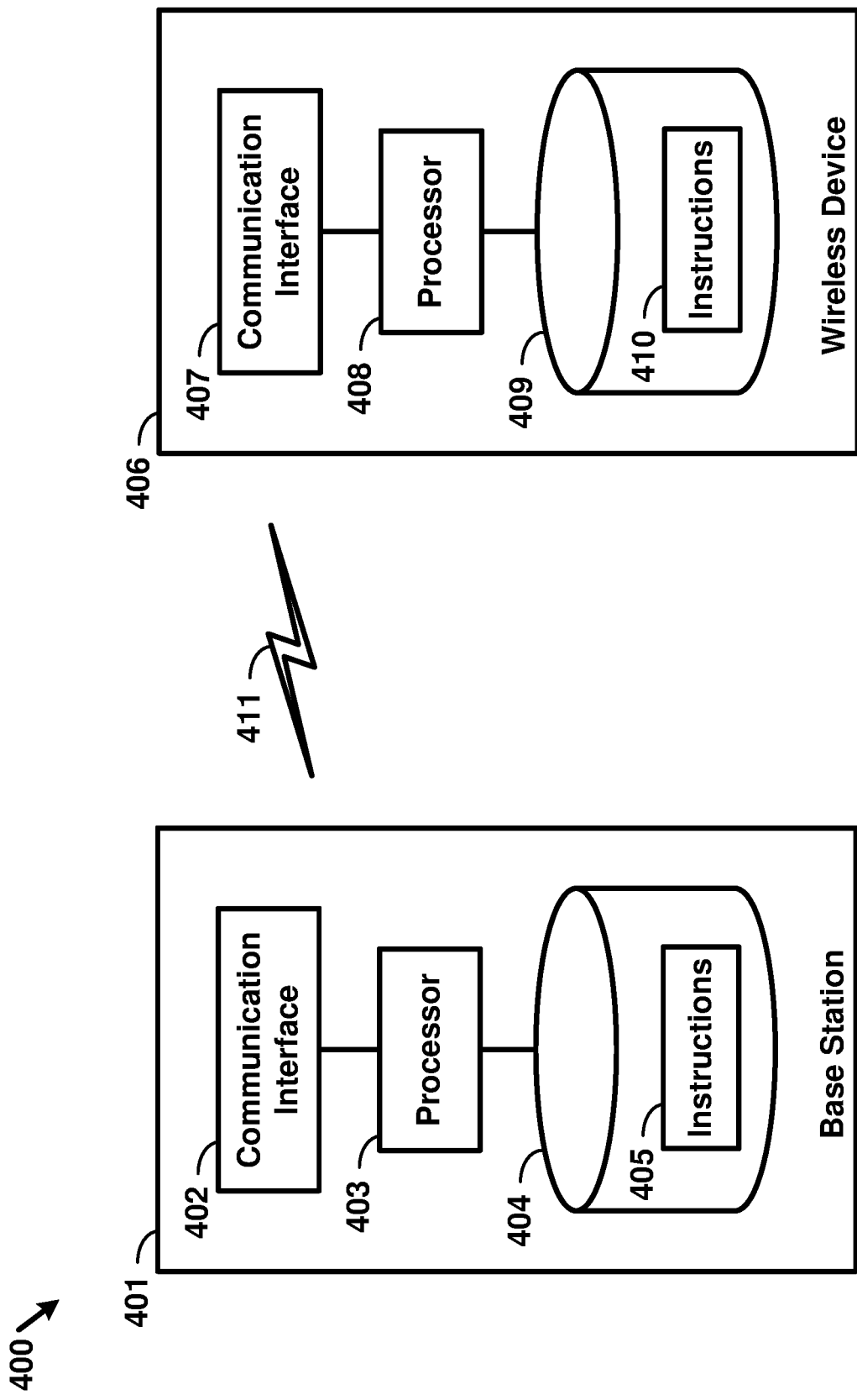
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
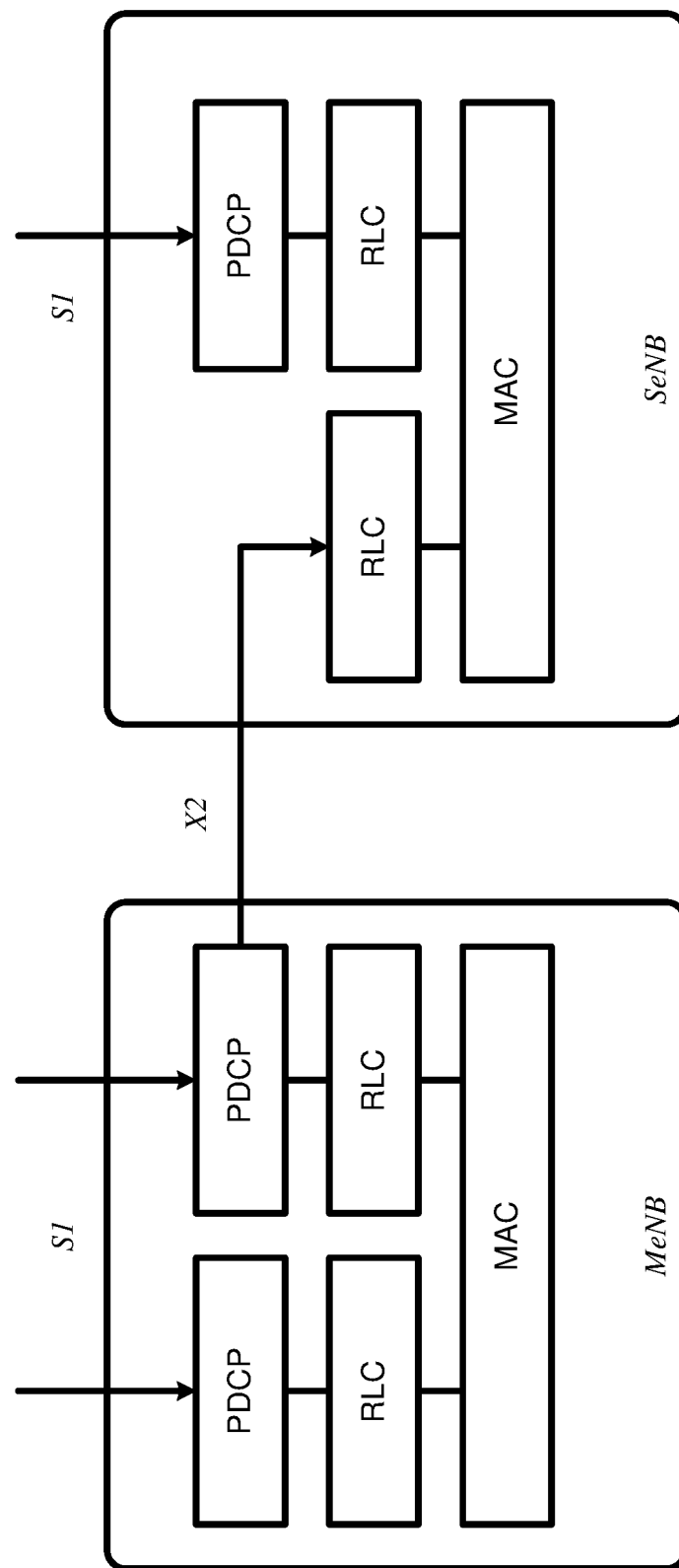
FIG. 6 is an example diagram for a protocol structure with CA and DC as per an aspect of an embodiment of the present disclosure.
Figure 7:
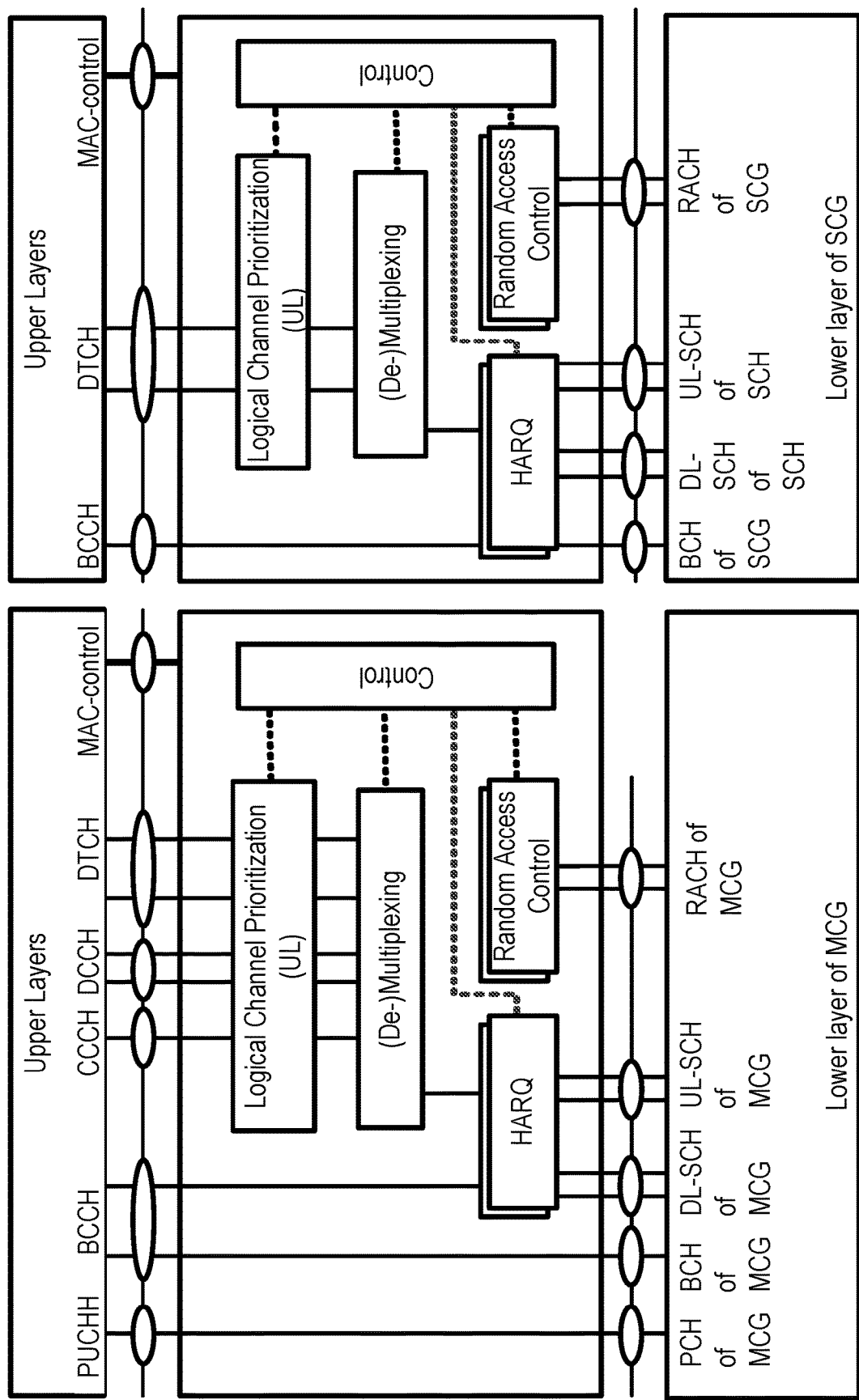
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
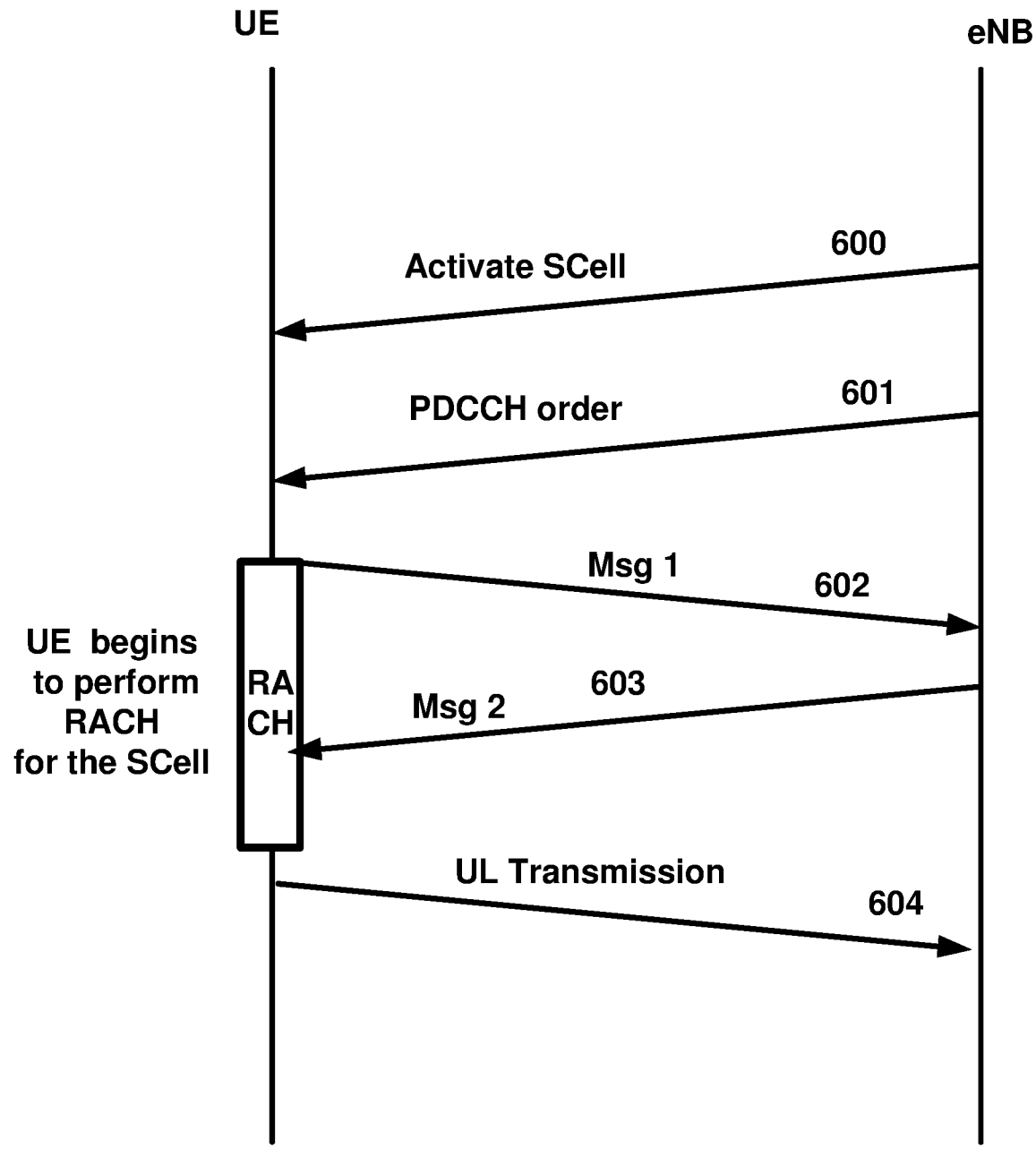
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
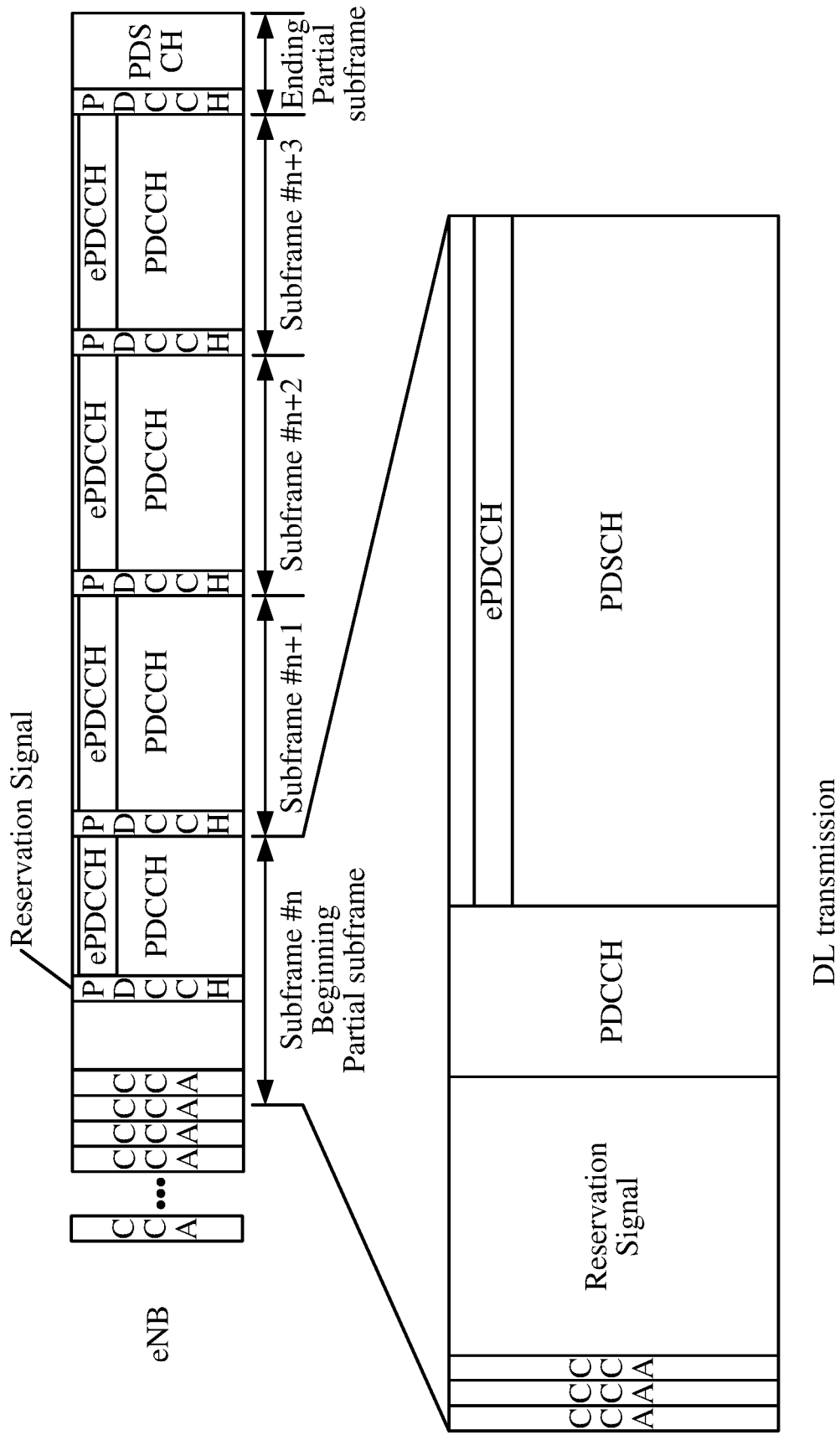
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one license cell and at least one unlicensed (for example, an LAA cell). The configuration parameters of a cell may, for example, comprise configuration parameters for physical channels, (for example, a ePDCCH, PDSCH, PUSCH, PUCCH and/or the like).

The latest standard documents 3GPP TS 36.211, 36.212, 36.212, 36.302 and 36.331 of V13.0 describe SRS processes. According to release 13 of the LTE standard, 3GPP TS 36.213, a UE may drop a sounding reference signal (SRS) transmission in many scenarios when an SRS transmission overlaps with the transmission of a PUCCH, a PUSCH, and/or a PRACH. SRS dropping when multiple TAGs in a CG are not configured may be higher since parallel transmission of SRS with PUSCH, PUCCH, PRACH in a CG may not be allowed.

The limitations in Release-13 may cause excessive dropping of SRS signals in the uplink, especially when a number of carriers are configured and activated, when uplink traffic is high, and/or more than one PUCCH is configured. For example, when PUCCH CGs are configured, PUCCH may be configured on PCell, and one or more SCells for transmission of control information to a given eNB. This may increase the possibility of overlapping PUCCH and SRS transmission that may result in increased SRS dropping. When a number of uplink channels are configured, and when uplink traffic is high, the possibility of overlapping transmission of SRS and PUSCH transport blocks may increase. This may result in increased SRS dropping.

Increased SRS dropping may also be observed when LAA cells are deployed. In an example embodiment, one or more LAA cells may be configured and/or activated. SRS signal transmission on LAA cells may collide with interference due to presence of other transmitters and/or hidden nodes. In an example embodiment, SRS transmission may be dropped due to LBT, if LBT is required for SRS transmission. In an example embodiment, SRS transmission may be dropped when no UL burst including PUSCH is transmitted. There is a need to enhance SRS transmission processes and reduce the probability of SRS dropping.

SRS signals may be transmitted by the UE, and may provide a base station with information about channel conditions. Reducing the dropping possibility of SRS signals in the uplink may enhance a base station's ability to estimate radio channel conditions. In an example scenario, the base station may need to transmit, in parallel, a combination of one or more of the following signals: a PRACH signal, a PUCCH signal, PUSCH signal(s), and SRS signal(s). The implementation of mechanisms employing parallel transmission of SRS and/or PRACH signals with other uplink physical channel signals may enhance network performance.

Example embodiments enhance the existing LTE Release-13 SRS transmission process, when features such as uplink LAA and/or other radio interface enhancements are introduced in release 14. The enhanced SRS transmission embodiments may be implemented to reduce the SRS dropping probability. Release 13 or prior wireless devices may follow their own implementation standard, and newer devices compatible to release 14 and/or higher may employ the enhanced SRS mechanisms. In an example, a release 13 wireless device may be configured with downlink-only LAA cells. A UE configured with LAA cells for downlink only transmission with no configured uplink may implement legacy SRS transmission procedures.

In an example embodiment, enhanced SRS transmissions are implemented when a UE is capable of transmission of UL LAA technology. A UE may transmit an RRC capability message comprising one or more parameters indicating that the UE is capable of UL configuration for an LAA cell. When the UE capability message includes UL LAA configuration and signal transmission capability, it may imply that the UE is capable of enhanced SRS transmission capability disclosed in example embodiments of the invention. The capability message may include for example certain band combination or certain transmission capability that implies the UE is capable of implementing enhanced SRS mechanisms.

In an example embodiment, enhanced SRS transmission is implemented when a UE is capable of a specific feature, e.g. enhanced-SRS feature, release 14 feature, LAA band capable. A UE may transmit an RRC capability message comprising one or more parameters indicating a first capability in the UE. The first capability may (explicitly or implicitly) imply that the UE is capable enhanced SRS mechanism. For example, when the UE capability message includes certain uplink transmission capability, it may imply that the UE is capable of enhanced SRS transmission capability disclosed in example embodiments of the invention.

In an example embodiment, when a UE is capable of a specific feature, e.g. enhanced-SRS feature, release 14 feature, LAA band capable, and/or LAA uplink carrier configuration, then enhanced SRS transmission may be implemented when the feature is actually configured in the UE. For example, a UE may be capable of UL LAA, then the enhanced SRS mechanism is implemented when the UE is capable of UL LAA and eNB configures at least one LAA carrier with uplink capability, or when the UE is capable of UL LAA and eNB configures at least one LAA carrier with uplink capability and SRS configuration. A UE may transmit an RRC capability message comprising one or more parameters indicating a first capability in the UE. The first capability may explicitly or implicitly imply that the UE is capable of enhanced SRS mechanism, when a first RRC configuration is configured in the wireless device by the eNB. For example, when the UE capability message includes UL LAA capability and when the eNB configures a cell with UL LAA transmission, it may imply that the UE is capable of enhanced SRS transmission capability disclosed in example embodiments of the invention. In an example, a UE may implement an example embodiment for enhanced SRS transmission when at least one an LAA cell with uplink is configured. In an example, a UE may implement an example embodiment for enhanced SRS transmission when at least one an LAA cell with uplink is configured and is activated.

In an example embodiment, an eNB may transmit at least one RRC message configuring RRC and may implicitly or explicitly configure the enhanced SRS mechanism. For example, the RRC message may include one or more parameters indicating that the enhanced SRS transmission is configured in the wireless device. For example, an SRS dedicated configuration parameter for the UE may configure the enhanced SRS mechanism in the UE. In another example embodiment, RRC message may not need to configure the enhanced SRS mechanism, and the UE may perform an enhanced SRS mechanism when it is configured with certain configuration or when the UE is compatible with certain features or certain releases of LTE advanced.

In an example embodiment, the enhanced SRS mechanism may be implemented in LAA cells with configured UL. SRSs are expected to be dropped in an LAA cell e.g. due to interference nature of the LAA cell. The enhanced SRS mechanism reduces SRS dropping probability in LAA cells. A UE may be configured for SRS transmission in an LAA cell in a subframe when PUSCH is transmitted in the subframe. SRS may be transmitted in the last symbol of a subframe, when SRS type 0 or 1 is configured for transmission in the subframe. SRS transmission in a subframe of a cell without PUSCH transmission in the subframe of the cell may be supported. In an example embodiment, and depending on the UE implementation/configuration SRS may be transmitted without LBT. The implementation may depend on the regulatory requirements and/or UE configuration/implementation for SRS transmission in an unlicensed band.

In Release-13, for example, a UE not configured with multiple TAGs shall not transmit SRS in a symbol whenever SRS and PUSCH transmissions happen to overlap in the same symbol in the same CG (MCG or SCG). Such mechanism may increase SRS dropping probability. When multiple TAGs are configured, parallel transmission of SRS in a cell with transmission of other signals (PUSCH/PUCCH/PRACH) in another cell may be allowed and configured. Example embodiments are implemented in a cell group (e.g. CG and/or PUCCH group) when multiple TAGs are not configured in the cell group. Uplink transmissions in multiple cells employing enhanced SRS transmissions belong to the same timing advance cell group and are uplink time aligned.

In an example embodiment, the enhanced SRS mechanism may be implemented in licensed cells with configured UL SRS transmission. The enhanced SRS mechanism may reduce SRS dropping probability in the cells Enhanced SRS mechanism may be implemented in unlicensed (e.g. LAA) cells, in licensed cells, or in both licensed and unlicensed (e.g. LAA) cells depending on implementation.

When enhanced SRS transmission mechanism is configured in a UE, SRS may be transmitted in a first cell in parallel with PUSCH transmission in another cell in the same cell group, even when multiple TAGs are not configured. In an example, enhanced SRS transmission is implemented for cells of the same CG and the same TAG.

In the current LTE specifications, if a UE is not configured with multiple TAGs and the UE is not configured with the parameter srs-UpPtsAdd for trigger type 1, the UE does not transmit SRS in a symbol when SRS transmission and PUSCH transmissions overlaps in the same symbol. Similar SRS behavior is supported if a UE is not configured with multiple TAGs and the UE is not configured with more than one serving cell of different CPs. If the UE is not configured with multiple TAGs, then the UE drops a configured SRS transmission on the LAA SCell thus creating a transmission gap. This may require the UE to perform LBT to access the channel again. The UE may lose the channel when LBT procedure fails. In current LTE technology, when transmission of PUSCH on an LAA cell happens in parallel with a configured transmission of an SRS on a licensed cell, the SRS on the licensed cell is dropped. This may increase SRS dropping on a licensed cell due to PUSCH or other traffic on an LAA cell.

In an example embodiment, an enhanced SRS mechanism may be implemented for LAA cells, licensed cells and/or both LAA and licensed cells. There is a need to support SRS mechanism on LAA cells. In additional, this may require an improvement in enhancing SRS dropping mechanism, otherwise, transmission of SRS in LAA cells may have a negative impact on other cells and increase SRS dropping in the system. The enhanced SRS mechanisms introduced in example embodiments provide a mechanism for transmission of SRS on LAA cells, licensed cells, and/or both licensed and LAA cells. The enhanced SRS mechanisms introduced in example embodiments provide a mechanism to reduce SRS dropping probability in the system. Example embodiments for SRS procedure in a subframe are implemented when the wireless device is not power limited in the uplink. When the wireless device is power limited, a configured SRS transmission may be dropped depending on transceiver criteria and uplink transmission implementation to maintain a total transmit power below an allowed transmission power.

The wireless device may receive from a base station at least one message comprising configuration parameters of a plurality of cells, the plurality of cells comprising at least two cell types. The two cell types comprising a licensed cell type and an unlicensed (e.g. licensed assisted access—LAA) cell type. The plurality of cells may comprise one or more licensed cells and one or more unlicensed (e.g. LAA) cells. The configuration parameters may comprise SRS configuration parameters.

Figure 11:
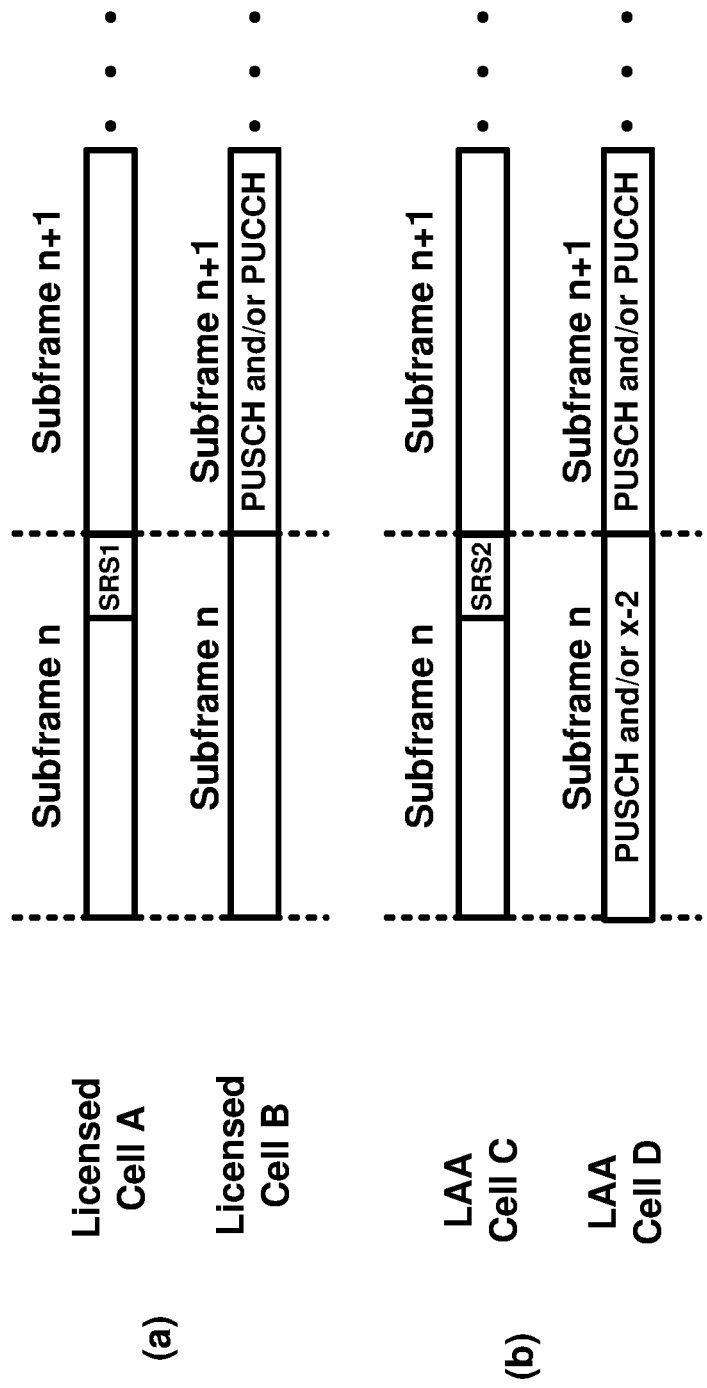
FIG. 11 is an example diagram depicting a plurality of cells as per an aspect of an embodiment of the present disclosure.
Figure 12:
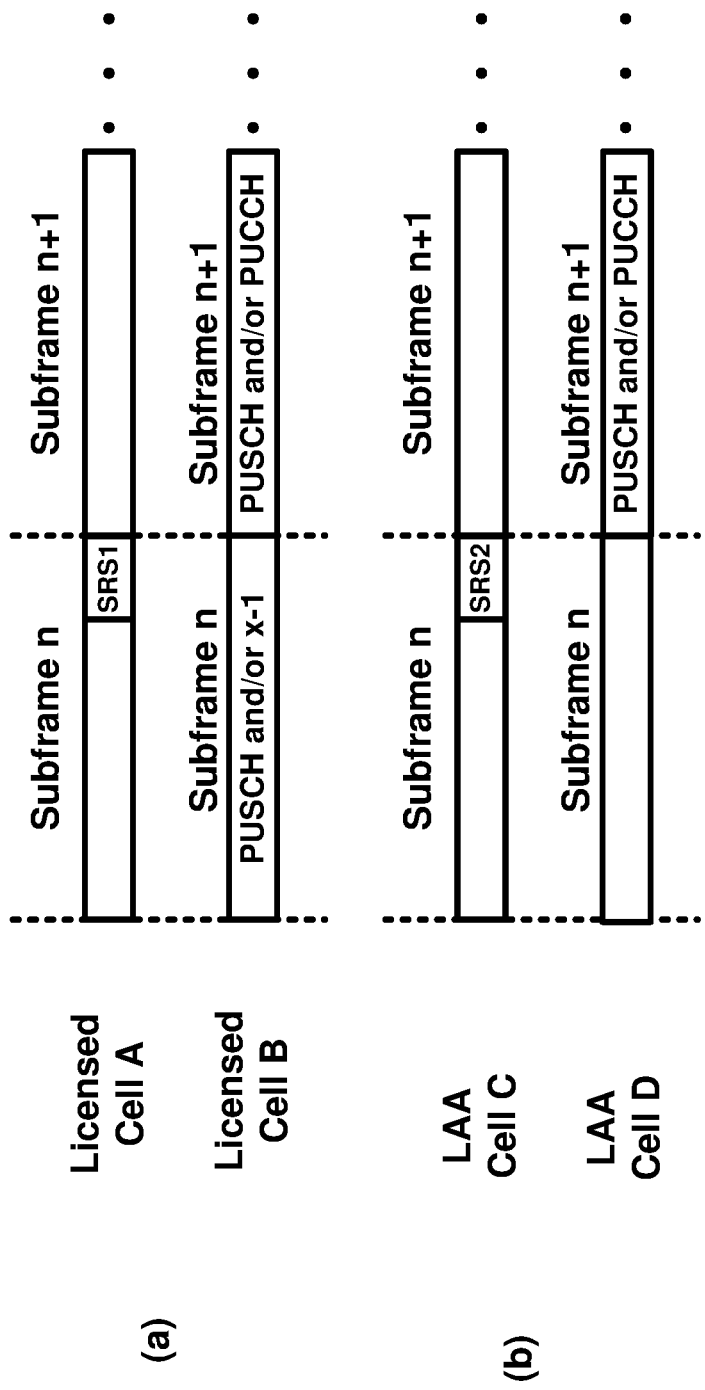
FIG. 12 is an example diagram depicting a plurality of cells as per an aspect of an embodiment of the present disclosure.
Figure 13:
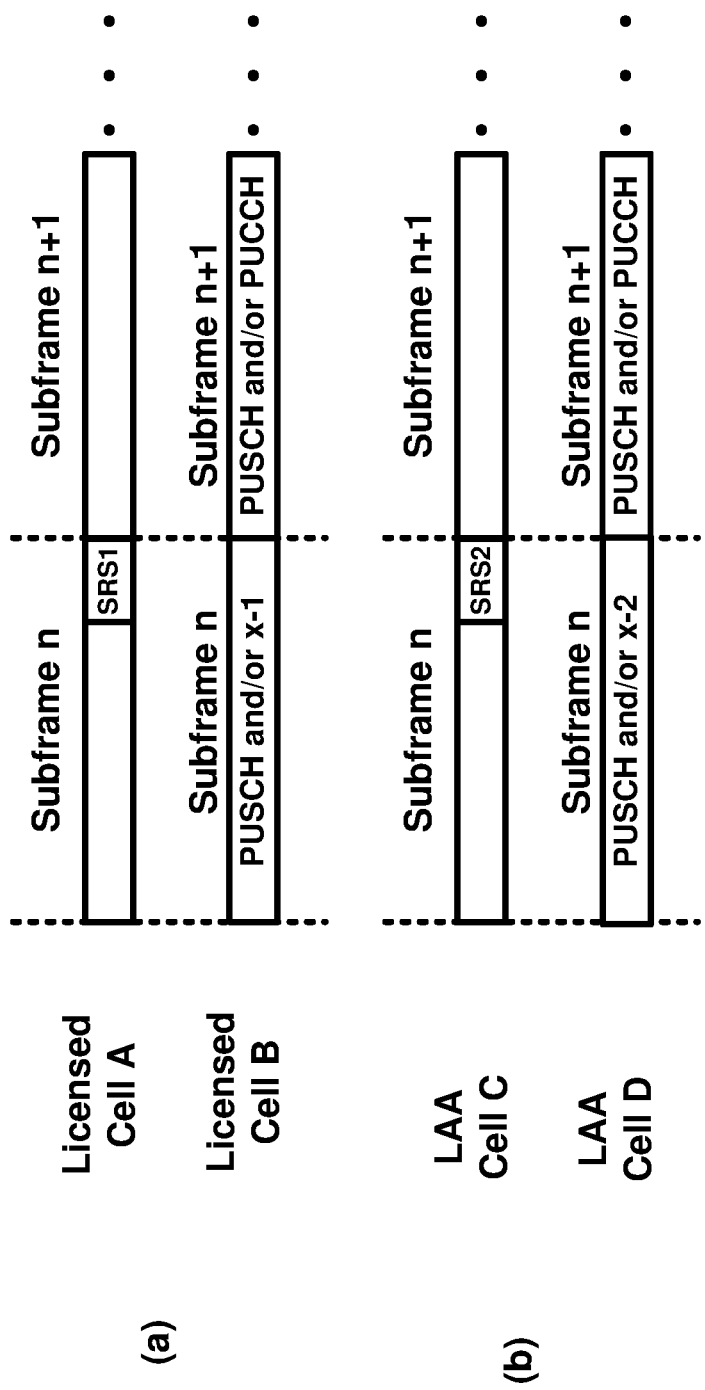
FIG. 13 is an example diagram depicting a plurality of cells as per an aspect of an embodiment of the present disclosure.

In an example embodiment, in a given subframe, when PUSCH and/or other signals are transmitted on the last symbol of an LAA cell, then SRS may be transmitted on other LAA cells in parallel with PUSCH and/or other signals on LAA cells and licensed cells. This mechanism may reduce SRS dropping in both LAA cells and licensed cells. This mechanism has advantages since it may reduce SRS dropping on both licensed and unlicensed cells and provide eNB with more SRSs on both licensed cells and unlicensed cells. eNB may be able to provide more accurate uplink channel and timing estimation for both licensed and unlicensed cells. In this example embodiment, transmission of SRS on an LAA cell is independent of parallel transmissions of other signals on a licensed cell. A sounding procedure implemented for transmission of SRS on an LAA cell may be independent of transmissions of a PUSCH and/or PUCCH in the one or more licensed cells. In an example, the sounding procedure for transmission of SRS on an LAA cell may be independent of transmissions of PUSCH and/or PUCCH on one or more other LAA cells or licensed cells. A sounding procedure implemented for transmission of SRS on licensed cell may be dependent on transmissions of a PUSCH and/or PUCCH in the one or more licensed cells. A sounding procedure implemented for transmission of SRS on licensed cell may be independent of transmissions of a PUSCH and/or PUCCH on the one or more LAA cells. For example, in FIG. 11 SRS 1 and SRS 2 may be transmitted. For example, in FIG. 12 and FIG. 13 SRS 1 may be dropped, but SRS 2 may be transmitted. In an example embodiment, in a given subframe, when PUSCH and/or other signals is transmitted on the last symbol a licensed cell, then SRS may be transmitted on other LAA cells in parallel with PUSCH and/or other signals on the licensed cell. In licensed cells, SRS may be dropped when it is scheduled for transmission with the PUSCH and/or other signals in a licensed cell. This mechanism may reduce SRS dropping in LAA cells. In an example, parallel transmission of PUSCH and/or PUCCH on a licensed cell and SRS on an unlicensed (e.g. LAA) cell is supported. Parallel transmission of PUSCH and/or PUCCH on an unlicensed cell and SRS on another unlicensed cell may be supported. Parallel transmission of PUSCH and/or PUCCH on an unlicensed (e.g. LAA) cell and SRS on a licensed cell may be supported. Parallel transmission of PUSCH and/or PUCCH on a licensed cell and SRS on another licensed cell may not be supported.

In an example embodiment, in a given subframe, when PUSCH and/or other signals (e.g. PUCCH, reservation signal, etc) are transmitted on the last symbol of a subframe of an LAA cell, then SRS may be transmitted on other LAA cells in parallel with PUSCH and/or other signals on LAA cell. In licensed cells, SRS may be dropped when it is scheduled for transmission with the PUSCH and/or other signals in LAA and/or licensed cell. For example, in FIG. 11, FIG. 12, and FIG. 13 SRS 1 may be dropped, but SRS 2 may be transmitted. In this example embodiment, transmission of SRS on an LAA cell is independent of parallel transmissions of other signals on a licensed cell. A sounding procedure implemented for transmission of SRS on an LAA cell may be independent of transmissions of a PUSCH and/or PUCCH in the one or more licensed cells. In an example, the sounding procedure for transmission of SRS on an LAA cell may be independent of transmissions of PUSCH and/or PUCCH on one or more other LAA cells. A sounding procedure implemented for transmission of SRS on a licensed cell may be dependent on transmissions of a PUSCH and/or PUCCH on the one or more licensed cells or LAA cell. This mechanism may reduce SRS dropping in LAA cells. In an example, the sounding procedure for transmission of SRS on an LAA cell may be independent of transmissions of PUSCH and/or PUCCH on one or more other LAA cells or licensed cells. A sounding procedure implemented for transmission of SRS on licensed cell may be dependent on transmissions of a PUSCH and/or PUCCH in the one or more licensed cells or one or more LAA cells. In an example, parallel transmission of PUSCH and/or PUCCH on a licensed cell and SRS on an unlicensed (e.g. LAA) cell is supported. Parallel transmission of PUSCH and/or PUCCH on an unlicensed cell and SRS on another unlicensed cell may be supported. Parallel transmission of PUSCH and/or PUCCH on an unlicensed (e.g. LAA) cell and SRS on a licensed cell may not be supported. Parallel transmission of PUSCH and/or PUCCH on a licensed cell and SRS on another licensed cell may not be supported.

In an example embodiment, in a given subframe, when PUSCH and/or other signals is transmitted on the last symbol a licensed cell, then SRS may be transmitted on other LAA and licensed cells in parallel with PUSCH and/or other signals on one or more licensed cells. This mechanism may reduce SRS dropping in both LAA cells and licensed cells. This mechanism has advantages since it may reduce SRS dropping on both licensed and unlicensed cells and provide eNB with more SRSs on both licensed cells and unlicensed cells. eNB may be able to provide more accurate uplink channel and timing estimation for both licensed and unlicensed cells. This mechanism requires a change in SRS transmission in licensed cell when the enhanced SRS mechanism is implemented. In an example embodiment, in a given subframe, when PUSCH and/or other signals is transmitted on the last symbol a licensed cell and unlicensed cells, then SRS may be transmitted on other LAA and licensed cells in parallel with PUSCH and/or other signals on licensed cells. This mechanism may reduce SRS dropping in both LAA cells and licensed cells. This mechanism has advantages since it may reduce SRS dropping on both licensed and unlicensed cells and provide eNB with more SRSs on both licensed cells and unlicensed cells. eNB may be able to provide more accurate uplink channel and timing estimation for both licensed and unlicensed cells. This mechanism requires a change in SRS transmission in licensed cell when the enhanced SRS mechanism is implemented. For example, in FIG. 11, FIG. 12 and FIG. 13, SRS 1 and SRS 2 may be transmitted. In an example, the sounding procedure for transmission of SRS on an LAA cell may be independent of transmissions of PUSCH and/or PUCCH on one or more other LAA cells or licensed cells. A sounding procedure implemented for transmission of SRS on licensed cell may be independent of transmissions of a PUSCH and/or PUCCH in the one or more licensed cells or one or more LAA cells. In this example embodiment, transmission of SRS on a cell (licensed or LAA) is independent of parallel transmissions of other signals on another cell (licensed or LAA). In an example, parallel transmission of PUSCH and or PUCCH on a cell (licensed or unlicensed) and SRS on another cell (licensed or unlicensed) is supported.

In an example embodiment, SRS transmission may be handled separately in different bands, e.g. licensed bands and unlicensed bands. In an example, SRS transmission may be handled in a group of one or more licensed cells independent from transmissions in a group of one or more LAA cells and vice versa. An SRS may be transmitted in parallel with PUSCH and/or other signals in another band (e.g. licensed or LAA). An SRS may not be transmitted in parallel with PUSCH and/or other signals in the same band (e.g. licensed or LAA). For example, an SRS may be transmitted in an LAA cell in parallel with PUSCH and/or other signals in a licensed cell. An SRS may be dropped in an LAA cell when it is configured for parallel transmission with PUSCH and/or other signals in another LAA cell. In an example embodiment, an SRS may be transmitted in a licensed cell in parallel with PUSCH and/or other signals in an LAA cell. An SRS may be dropped in a licensed cell when it is configured for parallel transmission with PUSCH and/or other signals in another licensed cell. For example, in FIG. 11, SRS 1 is transmitted and SRS 2 may be dropped. For example, in FIG. 12, SRS 2 is transmitted and SRS 1 may be dropped. For example, in FIG. 13, SRS 1 and SRS 2 may be dropped. In an example, the sounding procedure for transmission of SRS on an LAA cell may be independent of transmissions of PUSCH and/or PUCCH on one or more licensed cells. In an example, the sounding procedure for transmission of SRS on an LAA cell may be dependent on transmissions of PUSCH and/or PUCCH on one or more LAA cells. A sounding procedure implemented for transmission of SRS on licensed cell may be independent of transmissions of a PUSCH and/or PUCCH in or one or more LAA cells. A sounding procedure implemented for transmission of SRS on licensed cell may be dependent on transmissions of a PUSCH and/or PUCCH in or one or more licensed cells. In an example, parallel transmission of PUSCH and/or PUCCH on a licensed cell and SRS on an unlicensed (e.g. LAA) cell is supported. Parallel transmission of PUSCH and/or PUCCH on an unlicensed (e.g. LAA) cell and SRS on a licensed cell is supported. Parallel transmission of PUSCH and/or PUCCH on a licensed cell and SRS on another licensed cell may not be supported. Parallel transmission of PUSCH and/or PUCCH on an unlicensed (e.g. LAA) cell and SRS on another unlicensed (e.g. LAA) cell may not be supported.

The SRS dropping may be reduced in the example enhanced SRS mechanisms described in the specifications. Some embodiments enhance SRS mechanism in LAA cells, some in licensed cells, and some in both types of cells.

Depending on the UE implementation and/or configuration one of the enhanced SRS mechanisms or a combination of more than one embodiment may be implemented in the wireless device. The UE implementation may reduce SRS dropping probability on licensed and/or unlicensed cells.

The embodiments of the enhanced SRS transmission may enhance UL-SCH and SRS transmission in the uplink. In the following examples, a process is described for PUSCH transmission. SRS transmission may be assigned a higher priority in some example scenarios as described below.

In an example embodiment, for the case when one transport block is transmitted in the PUSCH conveying the HARQ-ACK bits, rank indicator bits or CRI bits:

$$Q' = \min\left(\left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C-1} K_r} \right\rceil, 4 \cdot M_{sc}^{PUSCH}\right)$$

where O is the number of HARQ-ACK bits, rank indicator bits or CRI bits, and $M_{sc}^{PUSCH}$ is the scheduled bandwidth for PUSCH transmission in the current sub-frame for the transport block, expressed as a number of subcarriers, and $N_{symb}^{PUSCH\text{-}initial}$ is the number of SC-FDMA symbols per subframe for initial PUSCH transmission for the same transport block, respectively, given by $N_{symb}^{PUSCH\text{-}initial} = (2 \cdot (N_{symb}^{UL}-1)-N_{SRS})$, where $N_{SRS}$ is equal to 1, if UE configured with one UL cell is configured to send PUSCH and SRS in the same subframe for initial transmission, or if UE transmits PUSCH and SRS in the same subframe in the same serving cell for initial transmission, or if the PUSCH resource allocation for initial transmission even partially overlaps with the cell-specific SRS subframe and bandwidth configuration, or if the subframe for initial transmission in the same serving cell is a UE-specific type-1 SRS subframe, or if the subframe for initial transmission in the same serving cell is a UE-specific type-0 SRS subframe and the UE is configured with multiple TAGs; or if the subframe for initial transmission in the same serving cell is a UE-specific type-0 SRS subframe and the UE is configured with enhanced SRS transmission mechanism; Otherwise $N_{SRS}$ is equal to 0.

$M_{sc}^{PUSCH\text{-}initial}$, C, and $K_r$ are obtained from the initial PDCCH or EPDCCH for the same transport block. If there is no initial PDCCH or EPDCCH with DCI format 0 for the same transport block, $M_{sc}^{PUSCH\text{-}initial}$, C, and $K_r$ shall be determined from: the most recent semi-persistent scheduling assignment PDCCH or EPDCCH, when the initial PUSCH for the same transport block is semi-persistently scheduled, or, the random access response grant for the same transport block, when the PUSCH is initiated by the random access response grant.

The formula above is an example embodiment for Q', and the example implementation indicates that PUSCH transmission may consider enhanced SRS transmission mechanism for uplink transmission. For example, the example mechanism above does not allow parallel transmission of SRS and PUSCH in the same cell. In an example embodiment, parallel transmission of SRS and PUSCH in the same cell may be implemented. This may further increase uplink transmission efficiency for PUSCH and/or SRS in the uplink. This enhance mechanism is further described in the specification.

In an example, for each antenna port p used for transmission of the PUSCH in a subframe the block of complex-valued symbols $z^{(\tilde{p})}(0), \ldots, z^{(\tilde{p})}(M_{symb}^{ap}-1)$ shall be multiplied with the amplitude scaling factor $\beta_{PUSCH}$ in order to conform to the transmit power $P_{PUSCH}$, and mapped in sequence starting with $z^{(\tilde{p})}(0)$ to physical resource blocks on antenna port p and assigned for transmission of PUSCH. The mapping to resource elements (k,l) corresponding to the physical resource blocks assigned for transmission and not used for transmission of reference signals, and not part of the last SC-FDMA symbol in a subframe, if the UE transmits SRS in the same subframe in the same serving cell, and not part of the last SC-FDMA symbol in a subframe configured with cell-specific SRS, if the PUSCH transmission partly or fully overlaps with the cell-specific SRS bandwidth, and not part of an SC-FDMA symbol reserved for possible SRS transmission in a UE-specific aperiodic SRS subframe in the same serving cell, and not part of an SC-FDMA symbol reserved for possible SRS transmission in a UE-specific periodic SRS subframe in the same serving cell when the UE is configured with multiple TAGs; and not part of an SC-FDMA symbol reserved for possible SRS transmission in a UE-specific periodic SRS subframe in the same serving cell when the UE is configured with enhanced SRS transmission mechanism.

In an example embodiment, a resource element (RE) is not employed for PUSCH transmission, if the RE is a part of an SC-FDMA symbol reserved for possible SRS transmission in a UE-specific periodic SRS subframe in the same serving cell when the UE is configured with enhanced SRS transmission mechanism.

SRS transmission mechanisms in release 13 and the example mechanisms presented above may not allow parallel transmission of SRS and PUSCH in the same cell. In an example embodiment, parallel transmission of SRS and PUSCH in the same cell may be implemented in the enhanced SRS mechanism. This may further increase uplink transmission efficiency for PUSCH and/or SRS in the uplink. This enhanced mechanism is further described in the specification.

In an example embodiment of the invention PUSCH signal transmissions may be further optimized by allowing parallel transmission of SRS and PUSCH signal transmission. Such configuration may be enabled when enhanced SRS configuration is implemented/configured.

In Release 13 and before, the mapping of PUSCH to resource elements (k,l) corresponding to the physical resource blocks assigned for transmission may consider that resource elements (k,l) is not part of the last SC-FDMA symbol in a subframe, if the UE transmits SRS in the same subframe in the same serving cell. This condition prevents parallel transmission of SRS with PUSCH signal in a subframe, even if they are not overlapping. This may reduce the radio resources for transmission of PUSCH and reduce overall uplink transmission efficiency.

In an example embodiment, SRS and PUSCH may be transmitted in parallel when SRS and PUSCH resources are not overlapping. In an example, PUSCH and/or other signals may be transmitted in the last SC-FDMA symbol in a subframe of a cell, if the UE transmits SRS in the same subframe in the same serving cell, and SRS is not overlapping with the transmission of PUSCH. This may increase available resources for transmission of PUSCH and/or other uplink signal transmissions. In this example enhanced SRS mechanism, uplink radio efficiency is increased in the uplink. An example of parallel transmission of SRS and PUSCH is shown in Figure D. In this example, the PUSCH transmission does not partly or fully overlaps with the cell-specific SRS bandwidth. Such mechanism may be implemented in only unlicensed cells, only in licensed cells, or both licensed and unlicensed cells.

In an example embodiment, SRS and PUSCH may be transmitted in parallel when SRS and PUSCH resources are overlapping. In an example, PUSCH and/or other signals may be transmitted in the last SC-FDMA symbol in a subframe of a cell, if the UE transmits SRS in the same subframe in the same serving cell, and SRS may overlap with the resource elements configured for PUSCH. This may increase available resources for transmission of PUSCH and/or other uplink signal transmissions. In this example enhanced SRS mechanism, uplink radio efficiency is increased in the uplink. An example of parallel transmission of SRS and PUSCH is shown in Figure E. In this example, the PUSCH transmission may partly overlap with UE-specific SRS and/or the cell-specific SRS bandwidth. In such a case, the resource elements that are overlapping with UE-specific SRS and/or cell-specific SRS bandwidth may not be used for PUSCH and/or other signals. The resource elements that are non-overlapping with UE-specific SRS and/or cell-specific SRS bandwidth may be used for PUSCH and/or other signals. Such mechanism may be implemented in only unlicensed cells, only in licensed cells, or both licensed and unlicensed cells.

Example embodiments of the inventions for enhanced SRS mechanisms are applicable when UE is not power limited and is capable of transmitting SRS signals as calculated by UE power control formulas. Some of the example embodiments may be combined to further enhance SRS transmission implementations. For example, SRS transmission in parallel with PUSCH in the same serving cell may be combined with SRS dropping mechanisms across different cells to further enhance the uplink efficiency.

In some cases, multiple LAA cells are activated and are aggregated at the UE and the UE may not be capable of simultaneous reception and transmission in the aggregated cells (a group of cells). In a given subframe, at least one of the cells in the group may be considered the leading cell and other cells in the group may be the following cells in the given subframe. The following constraints apply: if the subframe in the leading cell is a downlink subframe, the UE may not transmit any signal or channel on other cells in the group in the same subframe. For example, SRS signals may be dropped in other cells of the group.

In Release-13, a UE not configured with multiple TAGs shall not transmit SRS in a symbol whenever SRS and PUSCH transmissions happen to overlap in the same symbol in the same CG (MCG or SCG). Such mechanism may increase SRS dropping probability.

Enhanced mechanisms introduced in example embodiments of the invention reduces SRS dropping probability. In many instances, SRS signals are transmitted in parallel with PUSCH and/or other signals (e.g. PUCCH, reservation signals, other SRSs) in parallel in the same Cell Group (MCG and/or SCG).

In many scenarios, the UE may not have enough transmission power to transmit SRS signals and PUSCH and/or other signals in parallel Enhanced power control mechanisms are required to enable enhanced SRS transmission mechanisms when UE is power limited.

Figure 14:
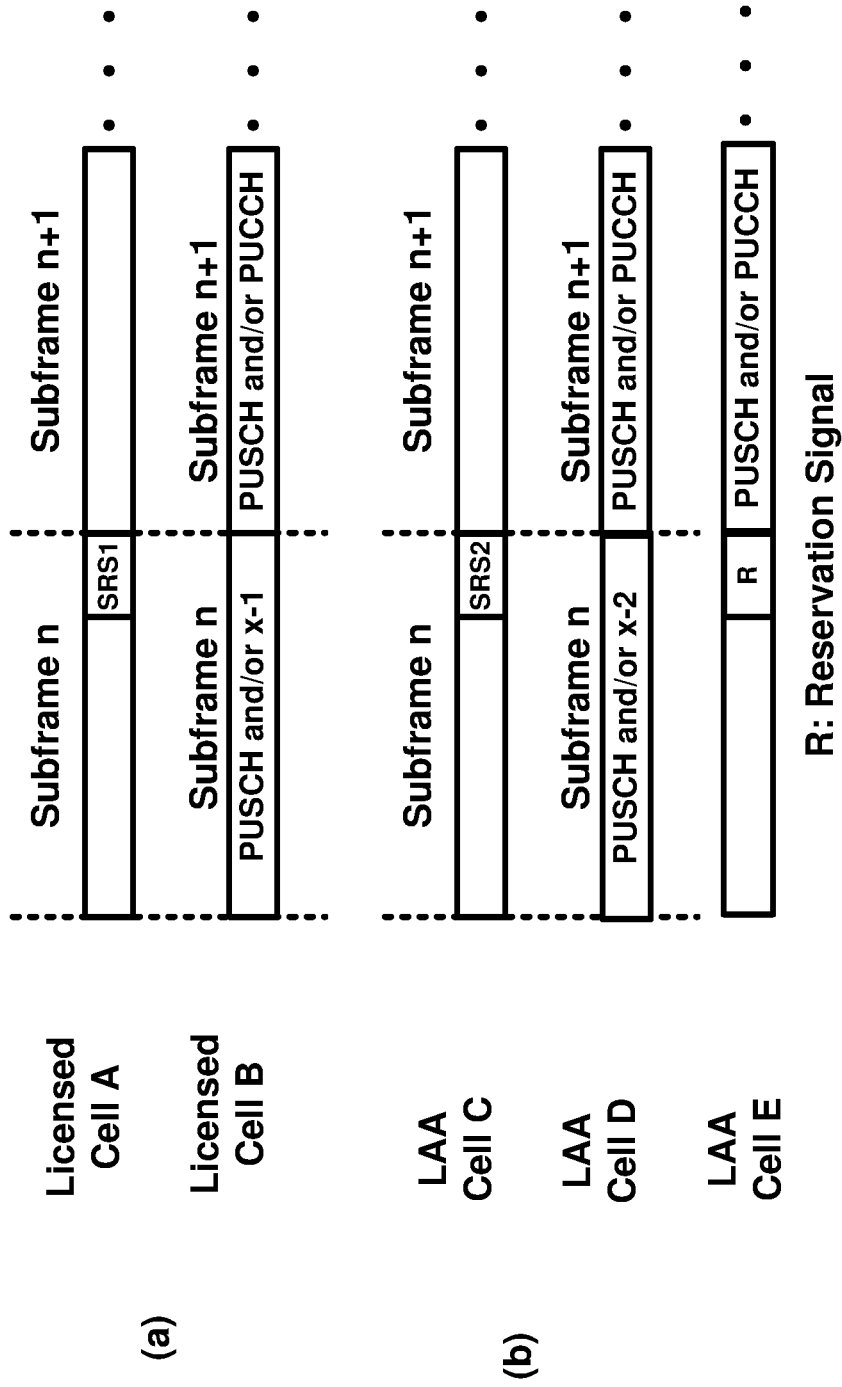
FIG. 14 is an example diagram depicting a plurality of cells as per an aspect of an embodiment of the present disclosure.

FIG. 14 describes an example embodiment, wherein SRS signals are transmitted in parallel with PUSCH and/or other signals and/or reservation signal. Many different combinations are possible. In an example implementation, transmission of reservation signals (R) may not be implemented in the UE. In another example implementation, transmission of reservation signals may be implemented in the UE.

In an example embodiments transmission powers may be assigned different transmission priorities. Assigning different transmission priorities to different signals in an enhanced SRS transmission mechanism may simplify the power management in the UE. In an example embodiment, there may be many implementations for handling signals with lower priorities, when the UE does not have enough transmission power. In one example embodiment, signals with lower priorities may be dropped when the UE does not have enough transmission power. In an example embodiment signals with lower priorities may be adjusted (scaled down) when the UE does not have enough transmission power. In an example embodiment, some of the signals with lower priorities may be dropped, and some others may be adjusted (scaled down) when the UE does not have enough transmission power.

For simplicity we may consider one CG in the following example embodiments. When DC or PUCCH CGs are configured, the UE may combine the example embodiments in a CG along with CG power control mechanisms disclosed in the specification.

Reservation signals are transmitted during a period that is expected to be smaller than one subframe but may be larger than or smaller than a symbol depending on the UE implementation/configuration and many other factors.

In an example embodiment, SRS transmission power may be assigned a lower priority compared with PUCCH, and PUSCH and R signal transmissions. In an example embodiment, there may be many implementations for handling signals with lower priorities, when the UE does not have enough transmission power. In one example embodiment, SRS may be dropped when the UE does not have enough transmission power. In an example embodiment SRS power may be adjusted (scaled down) when the UE does not have enough transmission power. In an example embodiment, some of the SRS signals with lower priorities may be dropped, and some other SRSs may be adjusted (scaled down) if needed when the UE does not have enough transmission power. For example, SRS in licensed bands or unlicensed bands may be dropped. In another example, a first type of SRS may be dropped and a second type of SRS may be transmitted and/or scaled down if needed.

In an example embodiment, SRS transmission power may be assigned a lower priority compared with PUCCH, and PUSCH signal transmissions, but not R signal transmissions. R signals transmission power may be assigned a lower priority compared with SRS. R signal transmission power may be scaled down or R signal may be dropped when the UE does not have enough transmit power.

The UE may calculate remaining power for SRS transmission according to the defined priorities.

In an example embodiment, when the UE does not have enough power to transmit SRS and PUSCH in parallel in multiple cells, the UE may drop SRS transmissions across all the cells in a CG. This mechanism may be simple but may increase the probability of SRS dropping in the UE.

In an example embodiment, when the UE does not have enough power to transmit SRS and PUSCH in parallel in multiple cells, the UE may consider different priorities for SRS signals in LAA cells and licensed cells.

For example, the UE may consider higher priority for SRS transmission on LAA cells compared with licensed cells. For example, the UE may drop SRS transmissions across licensed cells in a CG. The UE may transmit SRS transmissions across LAA cells in a CG if it has sufficient power. If the UE does not have sufficient power to transmit SRS on only LAA cells, then the UE also drops SRS transmission on LAA cells.

For example, the UE may consider higher priority for SRS transmission on licensed cells compared with LAA cells. For example, the UE may drop SRS transmissions across LAA cells in a CG. The UE may transmit SRS transmissions across licensed cells in a CG if it has sufficient power. If the UE does not have sufficient power to transmit SRS on only licensed cells, then the UE also drops SRS transmission on licensed cells.

In an example embodiment, SRS signals that are transmitted in a subframe of a serving cell that does not include PUSCH transmission may be prioritized differently from SRS signals that are transmitted in a subframe of a serving cell that includes transmission of PUSCH. For example, this may allow the UE to drop if SRS is transmitted alone without PUSCH in the subframe, when the UE is power limited, while the UE transmits SRS in a cell with PUSCH in the subframe of the cell (if UE has enough power). In another example, this may allow the UE to drop if SRS is transmitted with PUSCH in the subframe, when the UE is power limited, while the UE transmits SRS in a cell without PUSCH in the subframe of the cell (if UE has enough power).

In an example embodiment, SRS signals adjacent to PUSCH transmission (in the same or subsequent subframe) may be prioritized differently from SRS signals that are not adjacent to PUSCH. For example, this may allow the UE to drop if SRS is transmitted alone without PUSCH, when the UE is power limited, while the UE transmits SRS adjacent with PUSCH in the cell (if UE has enough power). In another example, this may allow the UE to drop if SRS adjacent PUSCH in the subframe, when the UE is power limited, while the UE transmits SRS that is not adjacent to PUSCH in the cell (if UE has enough power).

In an example embodiment, a UE may consider power scaling for SRS transmission in addition to the above priorities. This may allow the UE to transmit SRSs when adjusted (scaled down) transmission power when SRS transmission at the calculated power exceeds maximum transmission power. Instead of dropping SRSs of certain category, the UE may scale down the power of SRS transmission of a category. The lower category of SRS may still be dropped (if there is not enough power to transmit the SRS). In some embodiments all SRS transmissions may be considered of the same power category and/or priority. In an example, the UE may prioritize SRS transmission powers based on whether SRS is transmitted on a licensed or unlicensed band. For example, SRS in licensed bands or unlicensed bands may be scaled first depending on implementation. In another example, a first type of SRS may be scaled or dropped if needed, and a second type of SRS may be transmitted.

In an example embodiment, the UE may drop an SRS at the end of an uplink burst. The last symbol of the last full subframe may be dropped to allow for LBT by other UEs.

An example embodiment provides a power control mechanism for parallel transmission of SRS and PUSCH in the same cell. In some example embodiments of enhanced SRS mechanism, parallel SRS and PUSCH transmissions in a serving cell may be implemented. SRS and PUSCH powers may be calculated according to a power control formula and max power limitation in serving cell. In the example embodiment, the parallel SRS transmission with PUSCH in a serving cell may exceed the max transmission of the serving cell if no additional power control mechanism is adopted.

The UE may calculate the SRS and PUSCH transmission power on a given serving cell according to PUSCH and PUCCH power control formula. In an example embodiment, if the total transmission power of the UE in a serving cell exceeds the maximum transmission power, the UE may drop SRS transmission in the serving cell. In an example embodiment, if the total transmission power of the UE in a serving cell exceeds the maximum transmission power, the UE may scale down SRS transmission power in the serving cell so that the total transmission power is equal or below the maximum transmission power. In an example, SRS power of the serving cell may be scaled down, in another example the same scaling factor may be applied to a group of SRS signals.

In the power calculation, if SRS and PUSCH are transmitted and SRS and PUSCH transmission overlap in frequency, the maximum power calculation in the last symbol may consider that PUSCH is not transmitted in all the allocated symbols. The total PUSCH transmission power in the last symbol may be less than total PUSCH transmission in other symbols of the subframe of the serving cell, since less number of REs are employed for PUSCH in the last symbol. This may be considered in the PUSCH calculation for the last symbol. For example, if PUSCH is transmitted in 60% of the allocated REs, then 60% or subframe PUSCH is considered for the last symbol of PUSCSH. In an example embodiment, if the total transmission power of the UE in a serving cell exceeds the maximum transmission power, the UE may drop SRS transmission in the serving cell. In an example embodiment, if the total transmission power of the UE in a serving cell exceeds the maximum transmission power, the UE may scale down SRS transmission power in the serving cell so that the total transmission power is equal or below the maximum transmission power. In an example, SRS power of the serving cell may be scaled down, in another example the same scaling factor may be applied to a group of SRS signals.

Uplink power control may control the transmit power of the different uplink physical channels. For PUSCH, the transmit power $\hat{P}_{PUSCH,c}(i)$, may be first scaled by the ratio of the number of antennas ports with a non-zero PUSCH transmission to the number of configured antenna ports for the transmission scheme. The resulting scaled power may be split equally across the antenna ports on which the non-zero PUSCH is transmitted.

For PUCCH or SRS, the transmit power $\hat{P}_{PUCCH}(i)$, or $\hat{P}_{SRS,c}(i)$ may be split equally across the configured antenna ports for PUCCH or SRS. $\hat{P}_{SRS,c}(i)$ is the linear value of $P_{SRS,c}(i)$. For a serving cell with frame structure type 1, a UE may not be expected to be configured with UplinkPowerControlDedicated-v12x0.

In an example, the setting of the UE Transmit power for a Physical Uplink Shared Channel (PUSCH) transmission may be defined as follows. If the UE transmits PUSCH without a simultaneous PUCCH for the serving cell c, then the UE transmit power $P_{PUSCH,c}(i)$ for PUSCH transmission in subframe i for the serving cell c may be given by $$P_{PUSCH,c}(i) = \min\begin{cases} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{cases} [\text{dBm}]$$

In an example, if the UE transmits PUSCH simultaneous with PUCCH for the serving cell c, then the UE transmit power $P_{PUSCH,c}(i)$ for the PUSCH transmission in subframe i for the serving cell c is given by $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j)\cdot PL_c + \Delta_{TF,c}(i) + f_c(i) \end{cases} [\text{dBm}]$$

In an example, if the UE is not transmitting PUSCH for the serving cell c, for the accumulation of TPC command received with DCI format 3/3A for PUSCH, the UE may assume that the UE transmit power $P_{PUSCH,c}(i)$ for the PUSCH transmission in subframe i for the serving cell c is computed by $P_{PUSCH,c}(i) = \min\{P_{CMAX,c}(i), P_{O\_PUSCH,c}(1) + \alpha_c(1)\cdot PL_c + f_c(i)\}$ [dBm].

where, $P_{CMAX,c}(i)$ may be the configured UE transmit power in subframe i for serving cell c and $\hat{P}_{CMAX,c}(i)$ is the linear value of $P_{CMAX,c}(i)$. If the UE does not transmit PUCCH and PUSCH in subframe i for the serving cell c, for the accumulation of TPC command received with DCI format 3/3A for PUSCH, the UE may compute $P_{CMAX,c}(i)$ assuming MPR=0 dB, A-MPR=0 dB, P-MPR=0 dB and ☐TC=0 dB, where MPR, A-MPR, P-MPR and ☐TC. $\hat{P}_{PUCCH}(i)$ may be the linear value of $P_{PUCCH}(i)$. $M_{PUSCH,c}(i)$ may be the bandwidth of the PUSCH resource assignment expressed in number of resource blocks valid for subframe i and serving cell c. Parameters in the power control mechanism may be described in latest release of 3GPP TS 36.213 specifications. $PL_c$ may be the downlink path loss estimate calculated in the UE for serving cell c in dB and $PL_c$=referenceSignalPower–higher layer filtered RSRP, where referenceSignalPower is provided by higher layers for the reference serving cell and the higher layer filter configuration for the reference serving cell.

In an example, $\delta_{PUSCH,c}$ may be a correction value, also referred to as a TPC command and is included in PDCCH/EPDCCH with DCI format 0/4 for serving cell c or jointly coded with other TPC commands in PDCCH with DCI format 3/3A whose CRC parity bits are scrambled with TPC-PUSCH-RNTI. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the current PUSCH power control adjustment state for serving cell c is given by $f_{c,2}(i)$, and the UE may use $f_{c,2}(i)$ instead of $f_c(i)$ to determine $P_{PUSCH,c}(i)$. Otherwise, the current PUSCH power control adjustment state for serving cell c is given by $f_c(i)$. $f_{c,2}(i)$ and $f_c(i)$ are defined by: $f_c(i)=f_c(i-1)+\delta_{PUSCH,c}(i-K_{PUSCH})$ and $f_{c,2}(i)=f_{c,2}(i-1)+\delta_{PUSCH,c}(i-K_{PUSCH})$ if accumulation is enabled based on the parameter Accumulation-enabled provided by higher layers or if the TPC command $\delta_{PUSCH,c}$ is included in a PDCCH/EPDCCH with DCI format 0 for serving cell c where the CRC is scrambled by the Temporary C-RNTI. The value of $K_{PUSCH}$ may be predefined. $f_c(i)=\delta_{PUSCH,c}(i-K_{PUSCH})$ and $f_{c,2}(i)=\delta_{PUSCH,c}(i-K_{PUSCH})$ if accumulation is not enabled for serving cell c based on the parameter Accumulation-enabled provided by higher layers.

In an example, if the UE is not configured with an SCG or a PUCCH-SCell, and if the total transmit power of the UE would exceed $\hat{P}_{CMAX}(i)$, the UE may scale $\hat{P}_{PUSCH,c}(i)$ for the serving cell c in subframe i such that the condition $$\sum_c w(i)\cdot \hat{P}_{PUSCH,c}(i) \le (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \le w(i) \le 1$. In case there is no PUCCH transmission in subframe i $\hat{P}_{PUCCH}(i)=0$.

In an example, if the UE is not configured with an SCG or a PUCCH-Scell, and if the UE has PUSCH transmission with UCI on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that the condition $$\sum_{c \ne j} w(i)\cdot \hat{P}_{PUSCH,c}(i) \le (\hat{P}_{CMAX}(i) - \hat{P}_{PUCCH,j}(i))$$

is satisfied where $\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling may be applied to $\hat{P}_{PUSCH,j}(i)$ unless $$\sum_{c \ne j} w(i)\cdot \hat{P}_{PUSCH,c}(i) = 0$$

and the total transmit power of the UE still would exceed $\hat{P}_{CMAX}(i)$.

For a UE not configured with a SCG or a PUCCH-SCell, w(i) values may be the same across serving cells when w(i)>0 but for certain serving cells w(i) may be zero.

In an example, if the UE is not configured with an SCG or a PUCCH-SCell, and if the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i)))$$

$$\text{and} \sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i)).$$

In an example, if serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c may be defined by $$P_{PUCCH}(i) = \min\left\{\begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array}\right\} \text{ [dBm]}$$

In an example, if serving cell c is the primary cell, for PUCCH format 4/5, the setting of the UE Transmit power $P_{PUCCH}$ for the physical uplink control channel (PUCCH) transmission in subframe i for serving cell c is defined by $$P_{PUCCH}(i) = \min\left\{\begin{array}{l} P_{CMAX,c}(i), \\ P_{0\_PUCCH} + PL_c + 10\log_{10}(M_{PUCCH,c}(i)) + \Delta_{TF,c}(i) + \Delta_{F\_PUCCH}(F) + g(i) \end{array}\right\} \text{ [dBm]}$$

If the UE is not transmitting PUCCH for the primary cell, for the accumulation of TPC command for PUCCH, the UE may assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \text{ [dBm]}$$

In an example, the setting of the UE Transmit power $P_{SRS}$ for the SRS transmitted on subframe i for serving cell c may be defined by $$P_{SRS,c}(i) = \min\{P_{CMAX,c}(i), P_{SRS\_OFFSET,c}(m) + 10 \log_{10}(M_{SRS,c}) + P_{O\_PUSCH,c}(j) + \alpha_c(j) \cdot PL_c + f_c(i)\} \text{ [dBm]}$$

Where $P_{CMAX,c}(i)$ may be the configured UE transmit power in subframe i for serving cell c. $P_{SRS\_OFFSET,c}(m)$ may be semi-statically configured by higher layers for m=0 and m=1 for serving cell c. For SRS transmission given trigger type 0 then m=0 and for SRS transmission given trigger type 1 then m=1. $M_{SRS,c}$ may be the bandwidth of the SRS transmission in subframe i for serving cell c expressed in number of resource blocks. $f_c(i)$ may be the current PUSCH power control adjustment state for serving cell. $P_{O\_PUSCH,c}(i)$ and $\alpha_c(j)$ may be parameters as for subframe i, where j=1.

In an example, if the UE is not configured with an SCG or a PUCCH-SCell, and if the total transmit power of the UE for the Sounding Reference Symbol in an SC-FDMA symbol would exceed $\hat{P}_{CMAX}(i)$, the UE may scale $\hat{P}_{SRS,c}(i)$ for the serving cell c and the SC-FDMA symbol in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ in subframe i and w(i) is a scaling factor of $\hat{P}_{SRS,c}(i)$ for serving cell c where 0<w(i)≤1. In an example, in an enhanced SRS procedures some of the SRS signals may be prioritized over some other SRS signals. In an example, some of the SRS signals may be dropped or scaled according to an SRS priority mechanism in example embodiments.

In an example, if the UE is not configured with an SCG or a PUCCH-SCell, and if the UE is configured with multiple TAGs and the SRS transmission of the UE in an SC-FDMA symbol for a serving cell in subframe i in a TAG overlaps with the SRS transmission in another SC-FDMA symbol in subframe i for a serving cell in another TAG, and if the total transmit power of the UE for the Sounding Reference Symbol in the overlapped portion would exceed $\hat{P}_{CMAX}(i)$, the UE scales $\hat{P}_{SRS,c}(i)$ for the serving cell c and a of the overlapped SRS SC-FDMA symbols in subframe i such that the condition $$\sum_c w(i) \cdot \hat{P}_{SRS,c}(i) \leq \hat{P}_{CMAX}(i)$$

is satisfied where $\hat{P}_{SRS,c}(i)$ is the linear value of $P_{SRS,c}(i)$, $\hat{P}_{CMAX}(i)$ is the linear value of $P_{CMAX}$ in subframe i and w(i) is a scaling factor of $\hat{P}_{SRS,c}(i)$ for serving cell c where 0<w(i)≤1. In an example, in an enhanced SRS procedures some of the SRS signals may be prioritized over some other SRS signals. In an example, some of the SRS signals may be dropped or scaled according to an SRS priority mechanism in example embodiments.

In an example, if the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE may use $f_{c,2}(i)$ instead of $f_c(i)$ to determine $P_{SRS,c}(i)$ for subframe i and serving cell c.

In an example, a UE may transmit Sounding Reference Symbol (SRS) on per serving cell SRS resources based on two trigger types: trigger type 0: e.g. higher layer signalling and/or trigger type 1: e.g. DCI formats 0/4/1A for FDD and TDD and DCI formats 2B/2C/2D for TDD. In case both trigger type 0 and trigger type 1 SRS transmissions would occur in the same subframe in the same serving cell, the UE may only transmit the trigger type 1 SRS transmission.

A UE may be configured with SRS parameters for trigger type 0 and trigger type 1 on a serving cell. One or more of the following SRS parameters may be serving cell specific and semi-statically configurable by higher layers for trigger type 0 and for trigger type 1: Number of combs $K_{TC}$ for trigger type 0 and a configuration of trigger type 1, if configured; Transmission comb $\bar{k}_{TC}$, for trigger type 0 and a configuration of trigger type 1; Starting physical resource block assignment $n_{RRC}$, for trigger type 0 and a configuration of trigger type 1; duration: single or indefinite (until disabled), for trigger type 0; srs-ConfigIndex ISRS for SRS periodicity $T_{SRS}$ and SRS subframe offset $T_{offset}$, for trigger type 0 and SRS periodicity $T_{SRS,1}$ and SRS subframe offset $T_{offset,1}$, for trigger type 1; SRS bandwidth $B_{SRS}$, for trigger type 0 and a configuration of trigger type 1; Frequency hopping bandwidth, $b_{hop}$, for trigger type 0; Cyclic shift $n_{SRS}^{cs}$, for trigger type 0 and a configuration of trigger type 1; and Number of antenna ports $N_p$ for trigger type 0 and a configuration of trigger type 1.

According to various embodiments, the wireless device may comprise one or more processors and memory. The memory may store instructions that, when executed by the one or more processors, cause the wireless device to perform a series of actions. Embodiments of example actions are illustrated in the accompanying figures and specification.

Figure 15:
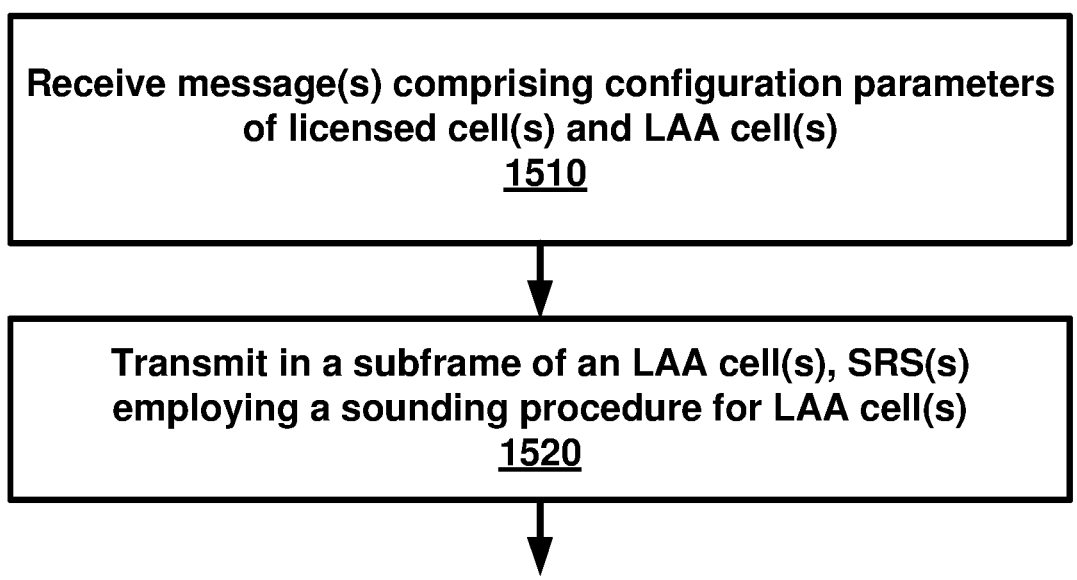
FIG. 15 is an example flow diagram as per an aspect of an embodiment of the present disclosure.

FIG. 15 is an example flow diagram as per an aspect of an embodiment of the present disclosure. A wireless device may receive at least one message at 1510. The at least one message may comprise configuration parameters of a plurality of cells. The plurality of cells may comprise one or more licensed cells and one or more licensed assisted access (LAA) cells. According to an embodiment, the plurality of cells may be in a same timing advance group (TAG). According to an embodiment, the plurality of cells may be in a same cell group and in a same physical uplink control channel (PUCCH) group. According to an embodiment, the at least one message may comprise SRS configuration parameters. The SRS configuration parameters comprise an SRS bandwidth parameter and an SRS subframe configuration parameter.

At least one sounding reference signal (SRS) may be transmitted at 1520. The transmission may be in a subframe on an LAA cell of the one or more LAA cells. The transmission may employ a sounding procedure for the one or more LAA cells. The sounding procedure may be independent of transmissions of a physical uplink shared channel (PUSCH) in the one or more licensed cells. The sounding procedure may comprise, for example, a first procedure for transmitting the at least one SRS and a second procedure for dropping configured transmissions of at least one second SRS. The transmitting of the at least one SRS may be, for example, in response to receiving downlink control information from a base station.

According to an embodiment, the wireless device may not be uplink power limited during the subframe. The wireless device may further transmit a message to a base station. The message may comprise one or more parameters. The one or more parameters may indicate that the wireless device supports an enhanced SRS transmission procedure. According to an embodiment, the one or more parameters may indicate that the wireless device supports configuration of an uplink for an unlicensed cell.

Figure 16:
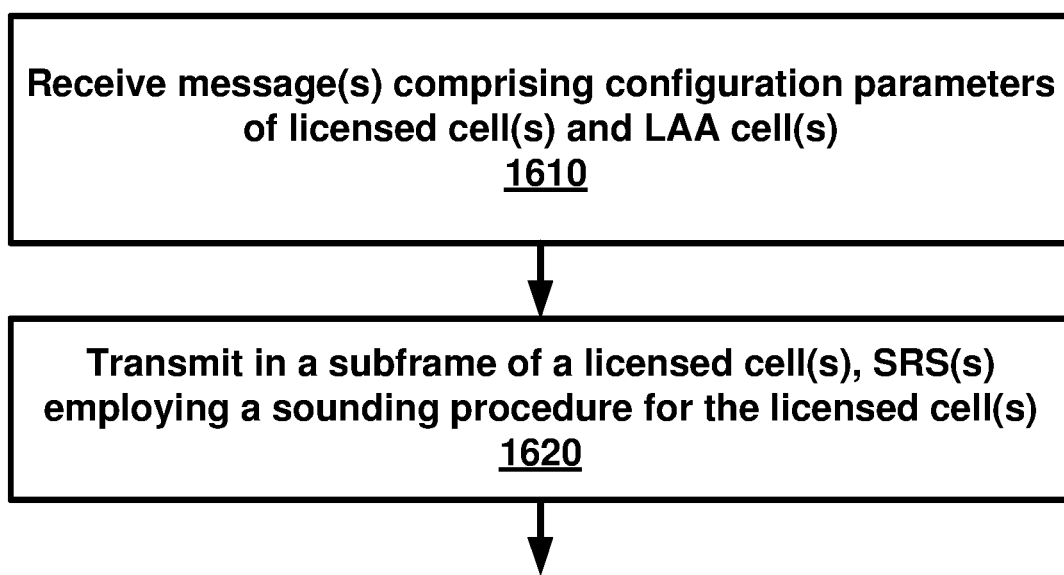
FIG. 16 is an example flow diagram as per an aspect of an embodiment of the present disclosure.

FIG. 16 is an example flow diagram as per an aspect of an embodiment of the present disclosure. A wireless device may receive at least one message at 1610. The at least one message may comprise configuration parameters of a plurality of cells. The plurality of cells may comprise one or more licensed cells and one or more licensed assisted access (LAA) cells. According to an embodiment, the plurality of cells may be in a same timing advance group (TAG).

At 1620, the wireless device may transmit, in a subframe on a licensed cell of the one or more licensed cells, at least one SRS. The at least one SRS may employ a sounding procedure for the one or more licensed cells. The sounding procedure may be independent of transmissions of a physical uplink shared channel (PUSCH) in the one or more LAA cells. According to an embodiment, the sounding procedure may comprise a first procedure for transmitting the at least one SRS and a second procedure for dropping configured transmissions of at least one second SRS. According to an embodiment, the at least one message may comprise SRS configuration parameters comprising an SRS bandwidth parameter and an SRS subframe configuration parameter. The wireless device may transmit the at least one SRS in response to receiving downlink control information from a base station.

The wireless device may, for example, not be uplink power limited during the subframe. According to an embodiment, the wireless device, may further transmit to a base station a message comprising one or more parameters. The one or more parameters may indicate, for example, that the wireless device supports an enhanced SRS transmission procedure. The one or more parameters may indicate, for example, that the wireless device supports configuration of an uplink for an unlicensed cell.

Figure 17:
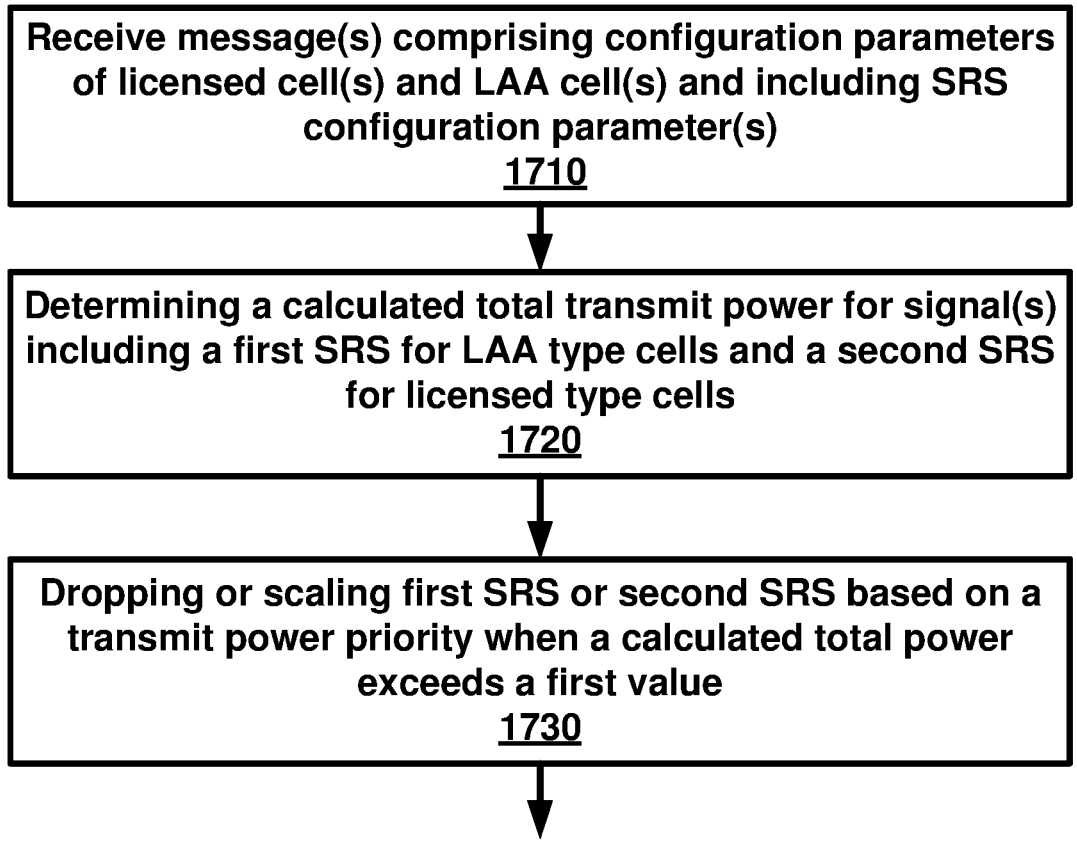
FIG. 17 is an example flow diagram as per an aspect of an embodiment of the present disclosure.

FIG. 17 is an example flow diagram as per an aspect of an embodiment of the present disclosure. At 1710, a wireless device may receive at least one message comprising configuration parameters of a plurality of cells. The plurality of cells may comprise at least two cell types. The at least two two cell types comprising a licensed cell type and a licensed assisted access (LAA) cell type.

A calculated total transmit power may be determined at 1720 for a plurality of signals. The plurality of signals may comprise a first SRS and a second SRS. The first SRS may be configured for transmission in a subframe of the LAA cell type in the plurality of cells. The second SRS may be configured for transmission in the subframe of the licensed cell type in the plurality of cells.

At 1730, the wireless device may drop or scale at least one of the first SRS or the second SRS based on a transmit power priority of the first SRS and the second SRS when a calculated total power exceeds a first value. The transmit power priority may consider whether the first SRS or the second SRS is configured for transmission on the licensed cell type or the unlicensed cell type. The first value may, for example, be a maximum allowed transmission power of the wireless device. The scaling of at least one of the first SRS or the second SRS may comprise, according to an embodiment, adjusting a transmit power of the at least one of the first SRS or the second SRS and transmitting the at least one of the first SRS or the second SRS in the subframe. The first SRS and the second SRS may be configured for transmission in a last symbol of the subframe. The second calculated total power may be below the first value when at least one of the first SRS or the second SRS is dropped or scaled.

The configuration parameters may comprise, for example, SRS configuration parameters. The SRS configuration parameters may comprise an SRS bandwidth parameter and an SRS subframe configuration parameter. According to an embodiment, the second SRS may be configured for transmission in response to receiving downlink control information from a base station.

The wireless device may further transmit a second message to a base station. The second message may comprise one or more second parameters. The one or more second parameters may, for example, indicate that the wireless device supports an enhanced SRS transmission procedure. The one or more second parameters may, for example, indicate that the wireless device supports configuration of an uplink for a cell of the unlicensed cell type. The wireless device may further transmit a transport block on at least one of the plurality of cells of the licensed cell type in the subframe.

Figure 18:
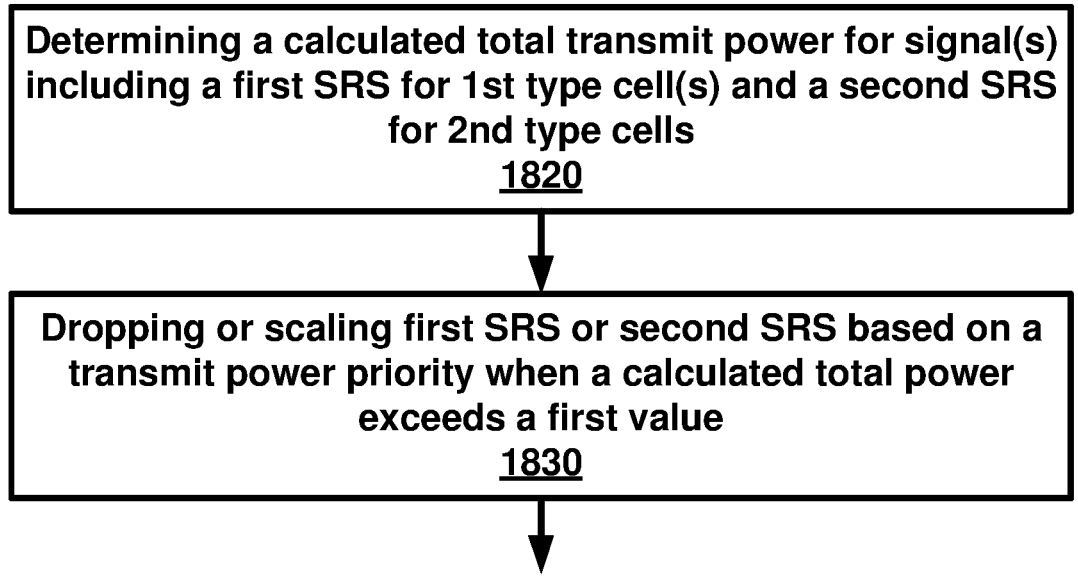
FIG. 18 is an example flow diagram as per an aspect of an embodiment of the present disclosure.

FIG. 18 is an example flow diagram as per an aspect of an embodiment of the present disclosure. At 1810, a calculated total transmit power may be determined for a plurality of signals. The plurality of signals may comprise a first SRS and a second SRS. The first SRS may be configured for transmission in a subframe of a LAA cell type. The second SRS may be configured for transmission in the subframe of a licensed cell type.

At 1820, at least one of the first SRS or the second SRS may be dropped or scaled based on a transmit power priority of the first SRS and the second SRS when a calculated total power exceeds a first value. The transmit power priority may consider whether the first SRS or the second SRS is configured for transmission on the licensed cell type or the unlicensed cell type.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, configuration parameters of one or more licensed cells and one or more unlicensed cells;
   transmitting, via a licensed cell of the one or more licensed cells, a physical uplink shared channel (PUSCH) signal;
   determining, independent of transmissions of the PUSCH signal via the licensed cell, whether to transmit or to drop a configured transmission of at least one sounding reference signal (SRS) via the one or more unlicensed cells, wherein the configured transmission of the at least one SRS overlaps with the PUSCH signal; and
   based on the determining:
      transmitting the at least one SRS via an unlicensed cell of the one or more unlicensed cells; or
      dropping the at least one SRS.

2. The method of claim 1, further comprising:
   determining, based on transmissions of the PUSCH signal via the licensed cell, whether to transmit or to drop a second configured transmission of at least one second SRS via a second licensed cell of the one or more licensed cells, wherein the second configured transmission of the at least one second SRS overlaps with the PUSCH signal; and
   based on the determining whether to transmit or to drop the second configured transmission:
      transmitting the at least one second SRS via the second licensed cell; or
      dropping the at least one second SRS.

3. The method of claim 1, wherein the wireless device is not uplink power limited during PUSCH transmission.

4. The method of claim 1, wherein the wireless device is uplink power limited during PUSCH transmission.

5. The method of claim 1, wherein the one or more licensed cells and one or more unlicensed cells are in a same timing advance group (TAG).

6. The method of claim 1, wherein the one or more licensed cells and one or more unlicensed cells are in a same physical uplink control channel (PUCCH) group.

7. The method of claim 1, further comprising transmitting to a base station a message comprising one or more parameters, the one or more parameters indicating that the wireless device supports an enhanced SRS transmission procedure.

8. The method of claim 1, further comprising transmitting to a base station a message comprising one or more parameters, the one or more parameters indicating that the wireless device supports configuration of an uplink for the unlicensed cell.

9. The method of claim 1, wherein the configuration parameters further comprise SRS configuration parameters comprising an SRS bandwidth parameter and an SRS subframe configuration parameter.

10. The method of claim 1, wherein the transmitting the at least one SRS is in response to receiving downlink control information from a base station.

11. A wireless device comprising:
   one or more processors; and
   memory storing instructions that, when executed by the one or more processors, cause the wireless device to:
      receive configuration parameters of one or more licensed cells and one or more unlicensed cells;
      transmit, via a licensed cell of the one or more licensed cells, a physical uplink shared channel (PUSCH) signal;
      determine, independent of transmissions of the PUSCH signal via the licensed cell, whether to transmit or to drop a configured transmission of at least one sounding reference signal (SRS) via the one or more unlicensed cells, wherein the configured transmission of the at least one SRS overlaps with the PUSCH signal; and
      based on the determining:
         transmitting the at least one SRS via an unlicensed cell of the one or more unlicensed cells; or
         dropping the at least one SRS.

12. The wireless device of claim 11, wherein the instructions, when executed by the one or more processors, further cause the wireless device to:
   determine, based on transmissions of the PUSCH signal via the licensed cell, whether to transmit or to drop a second configured transmission of at least one second SRS via a second licensed cell of the one or more licensed cells, wherein the second configured transmission of the at least one second SRS overlaps with the PUSCH signal; and
   based on the determination whether to transmit or to drop the second configured transmission:
      transmit the at least one second SRS via the second licensed cell; or
      drop the at least one second SRS.

13. The wireless device of claim 11, wherein the wireless device is not uplink power limited during PUSCH transmission.

14. The wireless device of claim 11, wherein the wireless device is uplink power limited during PUSCH transmission.

15. The wireless device of claim 11, wherein the one or more licensed cells and one or more unlicensed cells are in a same timing advance group (TAG).

16. The wireless device of claim 11, wherein the one or more licensed cells and one or more unlicensed cells are in a same physical uplink control channel (PUCCH) group.

17. The wireless device of claim 11, wherein the instructions, when executed by the one or more processors, further cause the wireless device to transmit to a base station, a message comprising one or more parameters, the one or more parameters indicating that the wireless device supports an enhanced SRS transmission procedure.

18. The wireless device of claim 11, wherein the instructions, when executed by the one or more processors, further cause the wireless device to transmit to a base station, a message comprising one or more parameters, the one or more parameters indicating that the wireless device supports configuration of an uplink for the unlicensed cell.

19. The wireless device of claim 11, wherein the configuration parameters further comprise SRS configuration parameters comprising an SRS bandwidth parameter and an SRS subframe configuration parameter.

20. The wireless device of claim 11, wherein the transmission of the at least one SRS is in response to receiving downlink control information from a base station.

* * * * *

UNITED STATES PATENT AND TRADEMARK OFFICE
CERTIFICATE OF CORRECTION

PATENT NO. : 10,797,840 B2
APPLICATION NO. : 16/432267
DATED : October 6, 2020
INVENTOR(S) : Esmael Dinan Page 1 of 1

It is certified that error appears in the above-identified patent and that said Letters Patent is hereby corrected as shown below:

On the Title Page

In item (60), replace "Provisional application No. 62/228,679, filed on Jan. 29, 2016" with --Provisional application No. 62/288,679, filed on Jan. 29, 2016--.

In the Specification

In Column 1, Line 8 to Line 12, replace "This application is a continuation of U.S. patent application Ser. No. 15/417,733, filed Jan. 27, 2017, which claims the benefit of U.S. Provisional Application No. 62/228,679, filed Jan. 29, 2016, which is hereby incorporated by reference in its entirety." with --This application is a continuation of U.S. patent application Ser. No. 15/417,733, filed Jan. 27, 2017, which claims the benefit of U.S. Provisional Application No. 62/288,679, filed Jan. 29, 2016.--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*